(12) United States Patent
Neal

(10) Patent No.: US 6,922,188 B2
(45) Date of Patent: Jul. 26, 2005

(54) METHOD AND APPARATUS FOR AUTO-GENERATION OF HORIZONTAL SYNCHRONIZATION OF AN ANALOG SIGNAL TO A DIGITAL DISPLAY

(75) Inventor: Greg Neal, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 548 days.

(21) Appl. No.: 10/086,654

(22) Filed: Feb. 27, 2002

(65) Prior Publication Data

US 2003/0063075 A1 Apr. 3, 2003

Related U.S. Application Data

(60) Provisional application No. 60/323,968, filed on Sep. 20, 2001.

(51) Int. Cl.[7] ................................. G09G 5/00
(52) U.S. Cl. .................... 345/204; 345/213; 345/99; 348/536; 348/537; 348/540
(58) Field of Search ............... 345/213, 204, 345/99, 50, 55; 348/536–537, 540, 531; 375/326, 376

(56) References Cited

U.S. PATENT DOCUMENTS

| 5,841,430 A | 11/1998 | Kurikko |
| 5,874,937 A | 2/1999 | Kesatoshi |
| 6,005,557 A | 12/1999 | Wong |
| 6,097,437 A | 8/2000 | Hwang |
| 6,097,444 A | 8/2000 | Nakano |
| 6,268,848 B1 | 7/2001 | Eglit |
| 6,313,822 B1 | 11/2001 | McKay et al. |
| 6,340,993 B1 | 1/2002 | Hasegawa et al. |
| 6,452,592 B2 * | 9/2002 | Zhang et al. ............ 345/213 |
| 6,501,310 B2 | 12/2002 | Takami |
| 6,522,365 B1 | 2/2003 | Levantovsky et al. |
| 6,559,837 B1 | 5/2003 | Lasneski et al. |
| 6,664,977 B1 | 12/2003 | Masumoto |
| 6,724,381 B2 | 4/2004 | Sakashita |
| 6,734,919 B2 | 5/2004 | Champion et al. |
| 6,750,855 B1 | 6/2004 | Von Hase |
| 6,753,926 B1 * | 6/2004 | Nishino ................ 348/537 |
| 2001/0022523 A1 | 9/2001 | Takami |
| 2002/0080280 A1 | 6/2002 | Champion et al. |
| 2003/0052872 A1 | 3/2003 | Neal |
| 2003/0052898 A1 | 3/2003 | Neal |

FOREIGN PATENT DOCUMENTS

| JP | 10091127 | 4/1998 |
| JP | 10153989 | 6/1998 |

* cited by examiner

Primary Examiner—Vijay Shankar
Assistant Examiner—Leonid Shapiro
(74) Attorney, Agent, or Firm—Beyer Weaver & Thomas, LLP

(57) ABSTRACT

A method of automatic generation of horizontal synchronization of an analog signal to a digital display is described. Accordingly, a number of features are found and for each of a range of test Htotal values, a pixel co-ordinate value for each of the found features is calculated. A pixel co-ordinate remainder value associated with each of the pixel co-ordinate values is determined and a maximum gap value of the pixel co-ordinate remainder values associated with a true horizontal resolution. is determined.

21 Claims, 20 Drawing Sheets

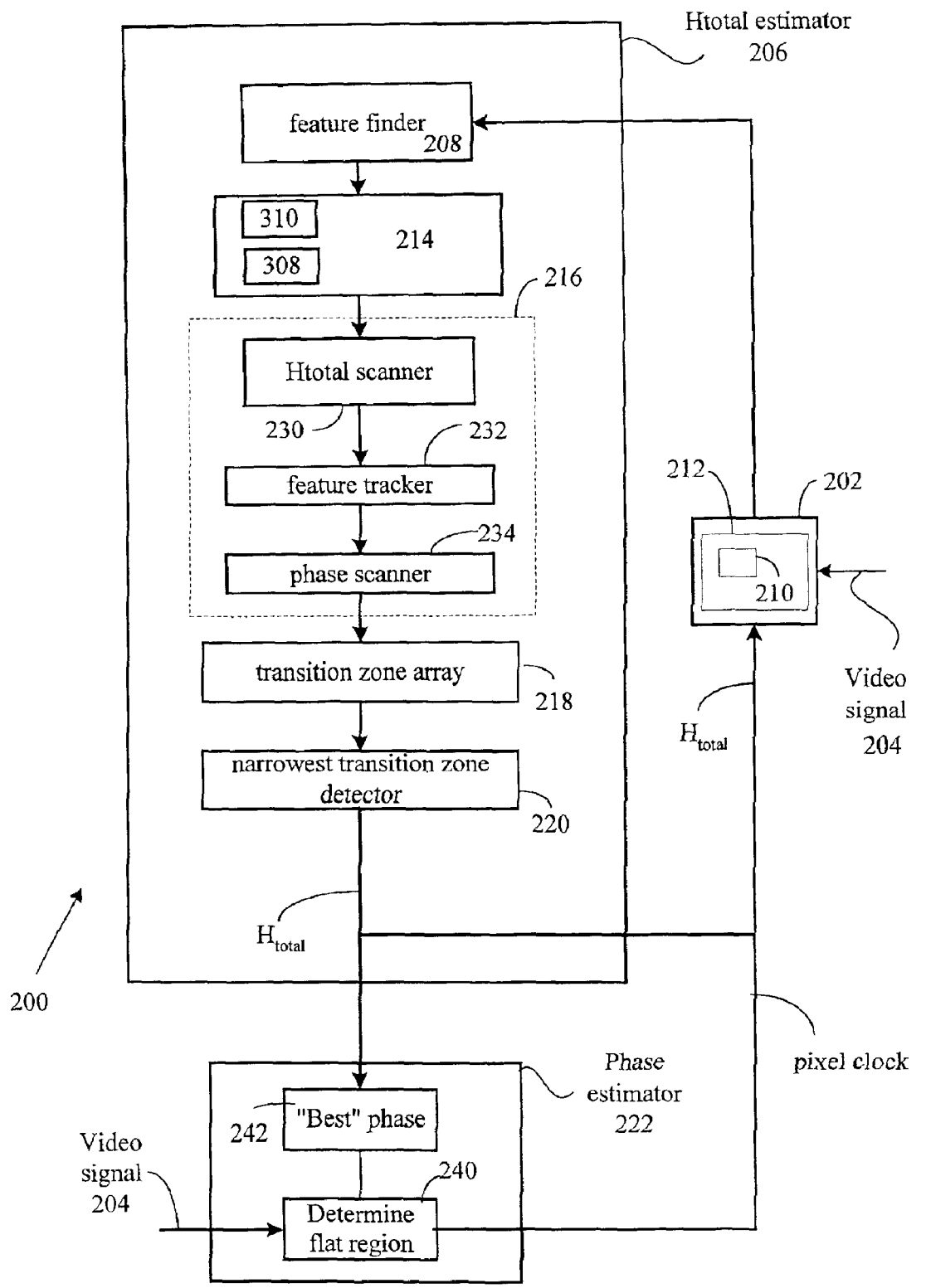

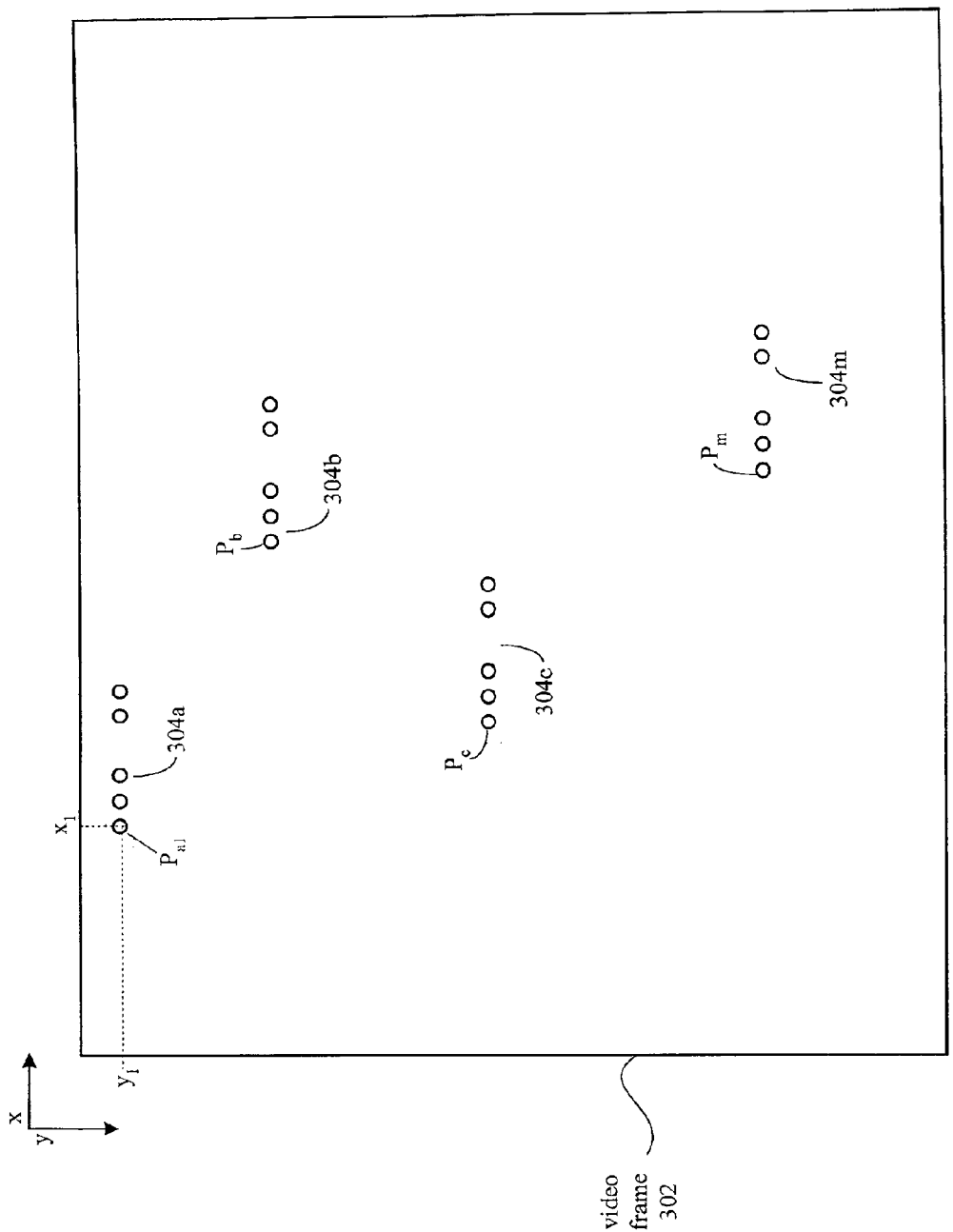

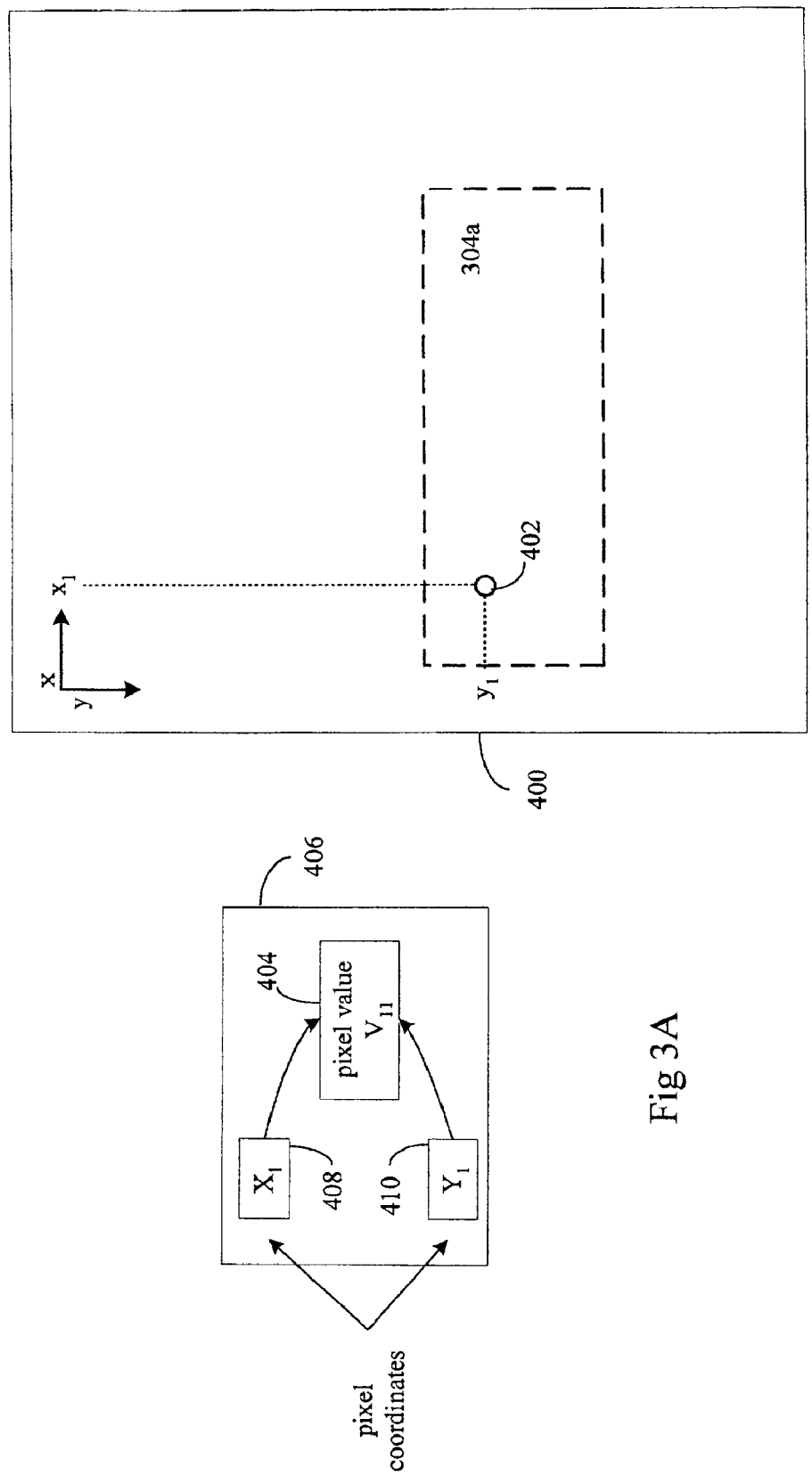

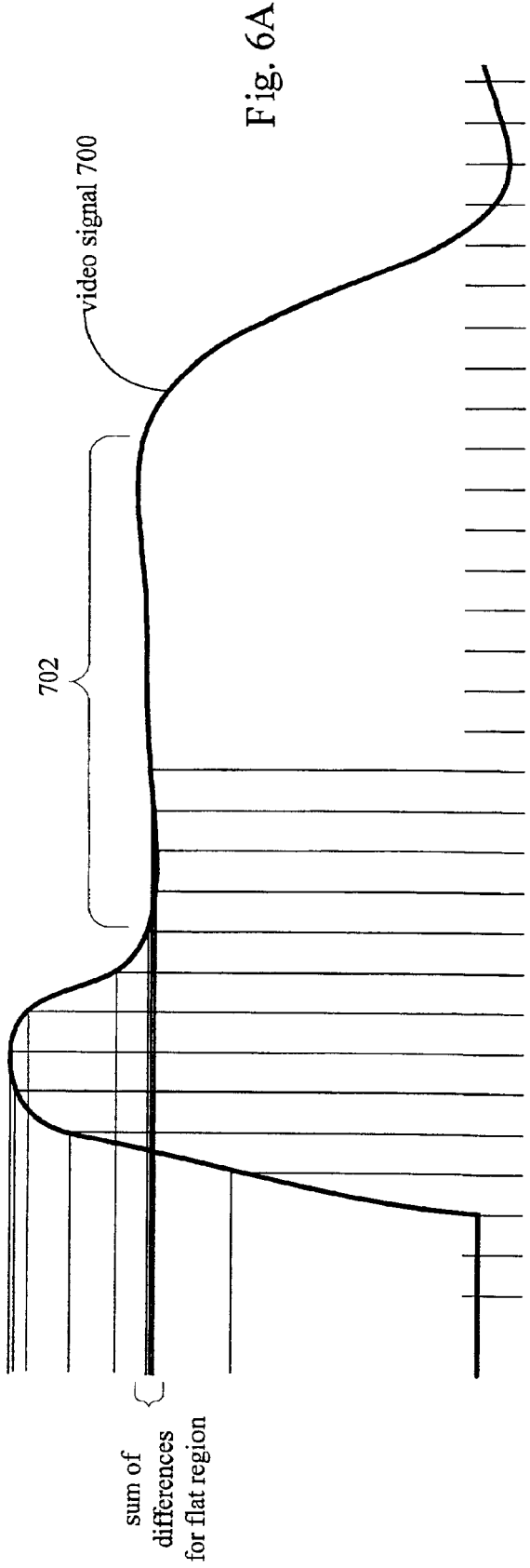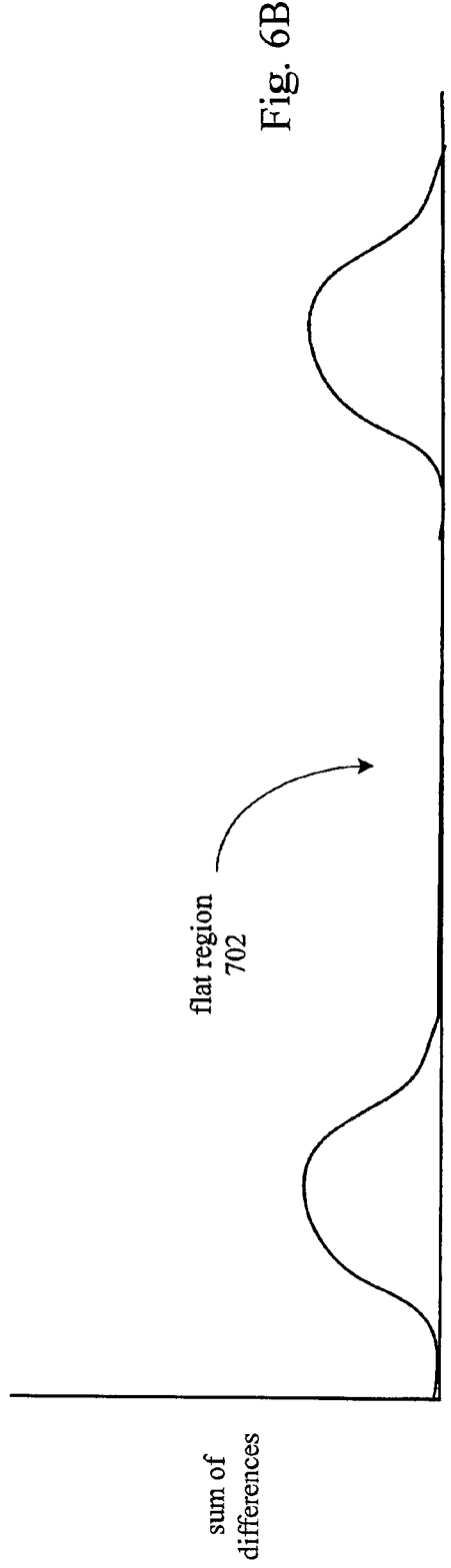

METHOD AND APPARATUS FOR AUTO-GENERATION OF HORIZONTAL SYNCHRONIZATION OF AN ANALOG SIGNAL TO A DIGITAL DISPLAY

CROSS REFERENCE TO RELATED APPLICATIONS

This application takes priority under 35 U.S.C. §119 (e) of U.S. Provisional Patent Application No. 60/323,968 entitled "METHOD AND APPARATUS FOR SYNCHRONIZING AN ANALOG VIDEO SIGNAL TO AN LCD MONITOR" by Neal filed Sep. 20, 2001 which is incorporated by reference in its entirety for all purposes. This application is also related to co-pending U.S. patent application Ser. No. 10/071,409 entitled "METHOD AND APPARATUS FOR SYNCHRONIZING AN ANALOG VIDEO SIGNAL TO AN LCD MONITOR" by Neal filed Feb. 8, 2002 which is incorporated by reference in its entirety.

BACKGROUND OF THE INVENTION

I. Field of the Invention

The invention relates to liquid crystal displays (LCDs). More specifically, the invention describes a method and apparatus for automatically determining a horizontal resolution and associated pixel clock rate.

II. Description of the Related Art

Digital display devices generally include a display screen including a number of horizontal lines. The number of horizontal and vertical lines defines the resolution of the corresponding digital display device. Resolutions of typical screens available in the market place include 640×480, 1024×768 etc. At least for the desk-top and lap-top applications, there is a demand for increasingly bigger size display screens. Accordingly, the number of horizontal display lines and the number of pixels within each horizontal line has also been generally increasing.

In order to display a source image on a display screen, each source image is transmitted as a sequence of frames each of which includes a number of horizontal scan lines. Typically, a time reference signal is provided in order to divide the analog signal into horizontal scan lines and frames. In the VGA/SVGA environments, for example, the reference signals include a VSYNC signal and an HSYNC signal where the VSYNC signal indicates the beginning of a frame and the HSYNC signal indicates the beginning of a next source scan line. Therefore, in order to display a source image, the source image is divided into a number of points and each point is displayed on a pixel in such a way that point can be represented as a pixel data element. Display signals for each pixel on the display may be generated using the corresponding display data element.

However, in some cases, the source image may be received in the form of an analog signal. Thus, the analog data needs to be converted into pixel data for display on a digital display screen. In order to convert the source image received in analog signal form to pixel data suitable for display on a digital display device, each horizontal scan line must be converted to a number of pixel data. For such a conversion, each horizontal scan line of analog data is sampled a predetermined number of times (HTOTAL) using a sampling clock signal (i.e., pixel clock). That is, the horizontal scan line is usually sampled during each cycle of the sampling clock. Accordingly, the sampling clock is designed to have a frequency such that the display portion of each horizontal scan line is sampled a desired number of times ($H_{TOTAL}$) that corresponds to the number of pixels on each horizontal display line of the display screen.

In general, a digital display unit needs to sample a received analog display signal to recover the pixel data elements from which the display signal was generated. For accurate recovery, the number of samples taken in each horizontal line needs to equal $H_{TOTAL}$. If the number of samples taken is not equal to $H_{TOTAL}$, the sampling may be inaccurate and resulting in any number and type of display artifacts (such as moire patterns).

Therefore what is desired is an efficient method and apparatus for determining a horizontal resolution of an analog video signal suitable for display on a fixed position pixel display such as an LCD.

SUMMARY OF THE INVENTION

According to the present invention, methods, apparatus, and systems are disclosed for determining a horizontal resolution of an analog video signal suitable for display on a fixed position pixel display such as an LCD.

In one embodiment, a method of automatic generation of horizontal synchronization of an analog signal to a digital display is described. Accordingly, a number of features are found and for each of a range of test Htotal values, a pixel co-ordinate value for each of the found features is calculated. A pixel co-ordinate remainder value associated with each of the pixel co-ordinate values is determined and a maximum gap value of the pixel co-ordinate remainder values associated with a true horizontal resolution is determined.

In another embodiment, an apparatus for automatically providing a horizontal synchronization is provided. The apparatus includes means for finding a number of features and for each of a range of test Htotal values, means for calculating a pixel co-ordinate value for each of the found features. Means for determining a pixel co-ordinate remainder value associated with each of the pixel co-ordinate values and means for determining a maximum gap value of the pixel co-ordinate remainder values associated with a true horizontal resolution.

BRIEF DESCRIPTION OF THE DRAWINGS

The invention will be better understood by reference to the following description taken in conjunction with the accompanying drawings.

FIG. 1 shows an analog video signal synchronizer unit in accordance with an embodiment of the invention.

FIGS. 2A–2B graphically illustrate finding a feature in accordance with an embodiment of the invention.

FIGS. 3A–3B graphically illustrate a particular implementation of a finding the feature shown in FIGS. 2A–2B.

FIGS. 6A–6B graphically illustrate determining a flat region of a video signal in accordance with an embodiment of the invention.

DETAILED DESCRIPTION OF SELECTED EMBODIMENTS

Figure 2B:
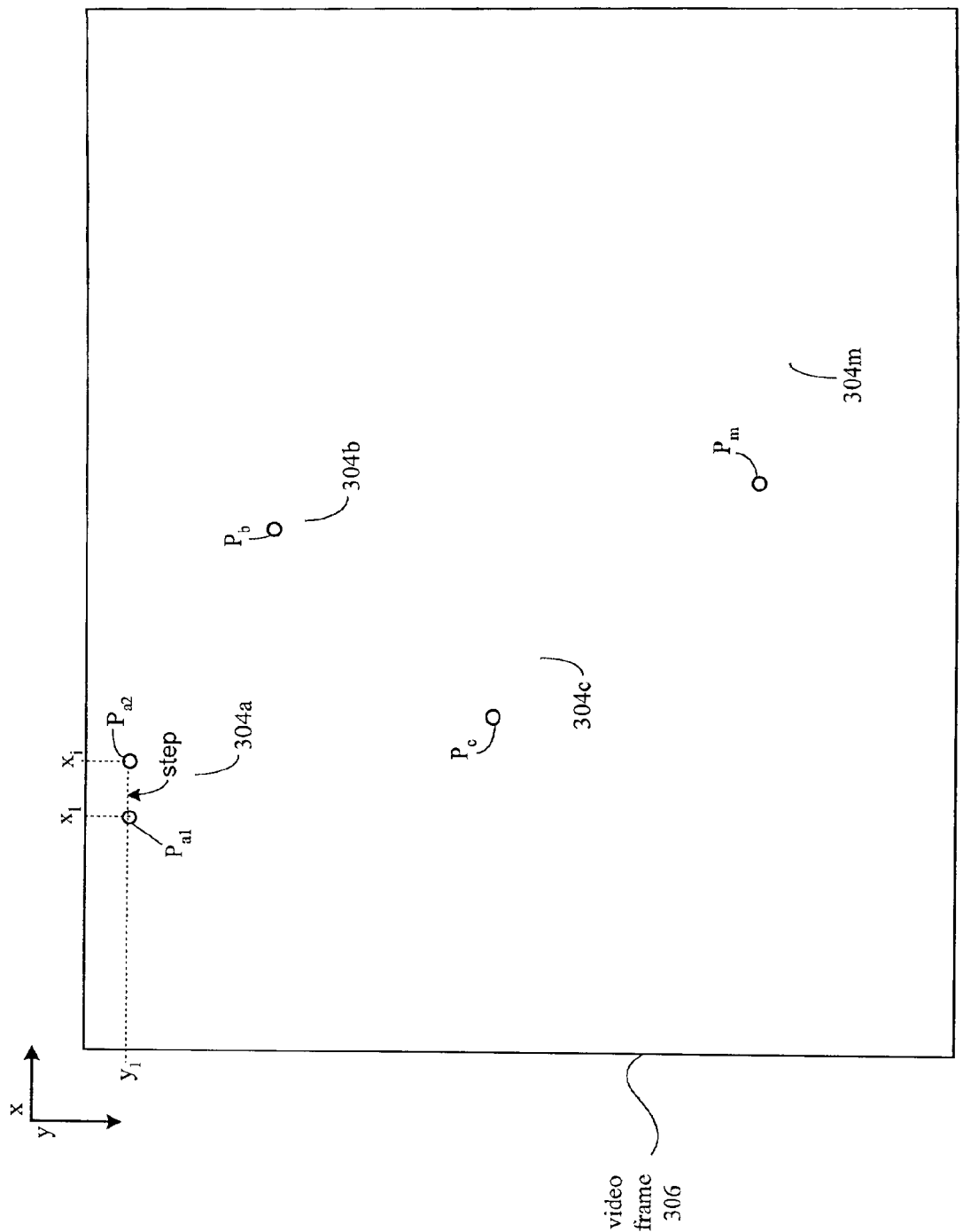

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In one embodiment, a method for determining a horizontal resolution ($H_{TOTAL}$) is described. Each of a succession of associated video frames are surveyed for a number of displayed features based upon a pseudo-random selection of regions into which the displayed video frame is divided. During successive associated video frames, a minimum number of features is determined based upon a pre-selected number of scans. Subsequent to the determination of the minimum number of features, a transition region for each of plurality of horizontal resolution values ($H_{TOTAL}$) is determined. Based upon a minimum transition zone, an associated $H_{TOTAL}$ is provided.

The invention will now be described in terms of an analog video signal synchronizer unit capable of providing a horizontal resolution ($H_{TOTAL}$) and a pixel clock $P_\phi$ and methods thereof capable of being incorporated in an integrated semiconductor device well known to those skilled in the art. It should be noted, however, that the described embodiments are for illustrative purposes only and should not be construed as limiting either the scope or intent of the invention.

Accordingly, FIG. 1 shows an analog video signal synchronizer unit 200 in accordance with an embodiment of the invention. In the described embodiment, the analog video signal synchronizer unit 200 is coupled to an exemplary digital display 202 (which in this case is an LCD 202) capable of receiving and displaying an analog video signal 204 from analog video source (not shown). It should be noted that the analog video signal synchronizer unit 200 can be implemented in any number of ways, such as a integrated circuit, a pre-processor, or as programming code suitable for execution by a processor such as a central processing unit (CPU) and the like. In the embodiment described, the video signal synchronizer unit 200 is typically part of an input system, circuit, or software suitable for pre-processing video signals derived from the analog video source such as for example, an analog still camera, and the like that can also include a digital visual interface (DVI).

In the described embodiment, the analog video signal synthesizer unit 200 includes a horizontal resolution estimator 206 arranged to provide a horizontal resolution value ($H_{TOTAL}$) corresponding to the video signal 204 as well as a pixel clock phase based, in part, upon $H_{TOTAL}$ as well as the video signal 204. The synthesizer unit 200 includes a feature finder 208 arranged to detect a feature 210 within an active display region 212 of the LCD 202. Once the feature finder 208 has detected, or found, the feature 210, the coordinates of the found feature 210 are stored in a found feature location array 214 coupled to the feature finder unit 208. Once all the coordinates of all the found features 210 are stored in the array 214, a transition zone detector 216 detects a number of transition zones described below that are subsequently stored in a transition zone array 218 coupled thereto. A narrowest transition zone detector 220 coupled to the transition zone array 218 detects a narrowest transition zone that corresponds to a correct horizontal resolution $H_{TOTAL}$.

Once $H_{TOTAL}$ has been determined by the horizontal resolution estimator 206, a pixel clock phase estimator 222 coupled thereto provides a best estimate of a pixel clock phase (Ø) based in part upon $H_{TOTAL}$ and the video signal 204. In the described embodiment, the pixel clock phase estimator 222 uses $H_{TOTAL}$ to provide a first estimate $P_{Ø1}$ of the pixel clock phase $P_Ø$ which is used as a initial condition for scanning a flat region of the video signal 204 in order to confirm the validity (or not) of the first estimate $P_{Ø1}$ as the best estimate of the pixel clock phase $P_Ø$. In this way, the analog video signal synchronizer unit 200 is capable of providing both $H_{TOTAL}$ and the pixel clock phase $P_Ø$ most consistent with the analog video signal 204 thereby providing the best "fit" of the image associated with the analog video signal 204 to the LCD 202. In those cases where the first estimate $P_{Ø1}$ is not the best fit, a second estimate $P_{Ø2}$ is generated, and so on, until a best fit of the image is obtained.

The following discussion describes operation of the analog video signal synchronizer unit 200 in accordance with a particular implementation of the invention. It should be noted, however, that the described operation is only one possible implementation and should therefore not be considered to be limiting either the scope or intent of the invention.

In operation, the feature finder 208 begins a feature search by pseudo-randomly selecting a number of pixels included in a first video frame 302 that are displayed in the active area display 212 as shown in FIG. 2A. For example, the feature finder 208 begins by pseudo-randomly selecting a number of pixels $P_a$–$P_m$ included in the frame 302 each of which is associated with a region 304a–304m. It should be noted that in the described embodiment, the regions 304a–304m are formed of a group of associated horizontal pixels but can, of course, be any appropriately arranged group of pixels such as, for example, a rectangular range of pixels.

In the described embodiment, the feature finder 208 then stores for each first pixel in each region (such as, for example, pixel $P_1$ of the region 304a) an associated first pixel video signal value $P_{1val}$ in, for example, a register (not shown) or other such data latch. Using the region 304a as an example, during a subsequent video frame 306, the feature finder 208 selects a second pixel coordinate $(x_i, y_1)$ associated with a second pixel P2 as shown in FIG. 2B by incrementing the x pixel coordinate only of the first pixel coordinate $(x_1, y_1)$ and storing an associated second pixel video signal value $P_{2val}$ associated with the second pixel P2. At this point, the feature finder 208 compares an absolute value of the first pixel video signal value $P_{1val}$ to an absolute value of the second pixel video signal value $P_{2val}$ according to equation 1:

$$\text{Edge} = \text{Abs}\{P_{1val}\} - \text{Abs}\{P_{2val}\} \qquad \text{equation 1.}$$

If a value of Edge is positive, then the second pixel P2 corresponds to what is referred to as a rising edge type pixel associated with a rising edge feature. Conversely, if the value of Edge is negative, then the second pixel P2 corresponds to a falling edge pixel corresponding to a falling edge feature. It should be noted that at this point, all coordinates corresponding to all rising edge features and falling edge features so found are stored, respectively, in a rising edge array 308 and a falling edge array 310 as part of the found feature array 214. In some embodiments, the total number of found features are tallied and compared to a minimum number of found features. In some embodiments, this minimum number can be as low as four or as high as 10 depending on the situation at hand. This is done in order to optimize the ability to ascertain $H_{TOTAL}$ since too few found features can provide inconsistent results.

Figure 3B:
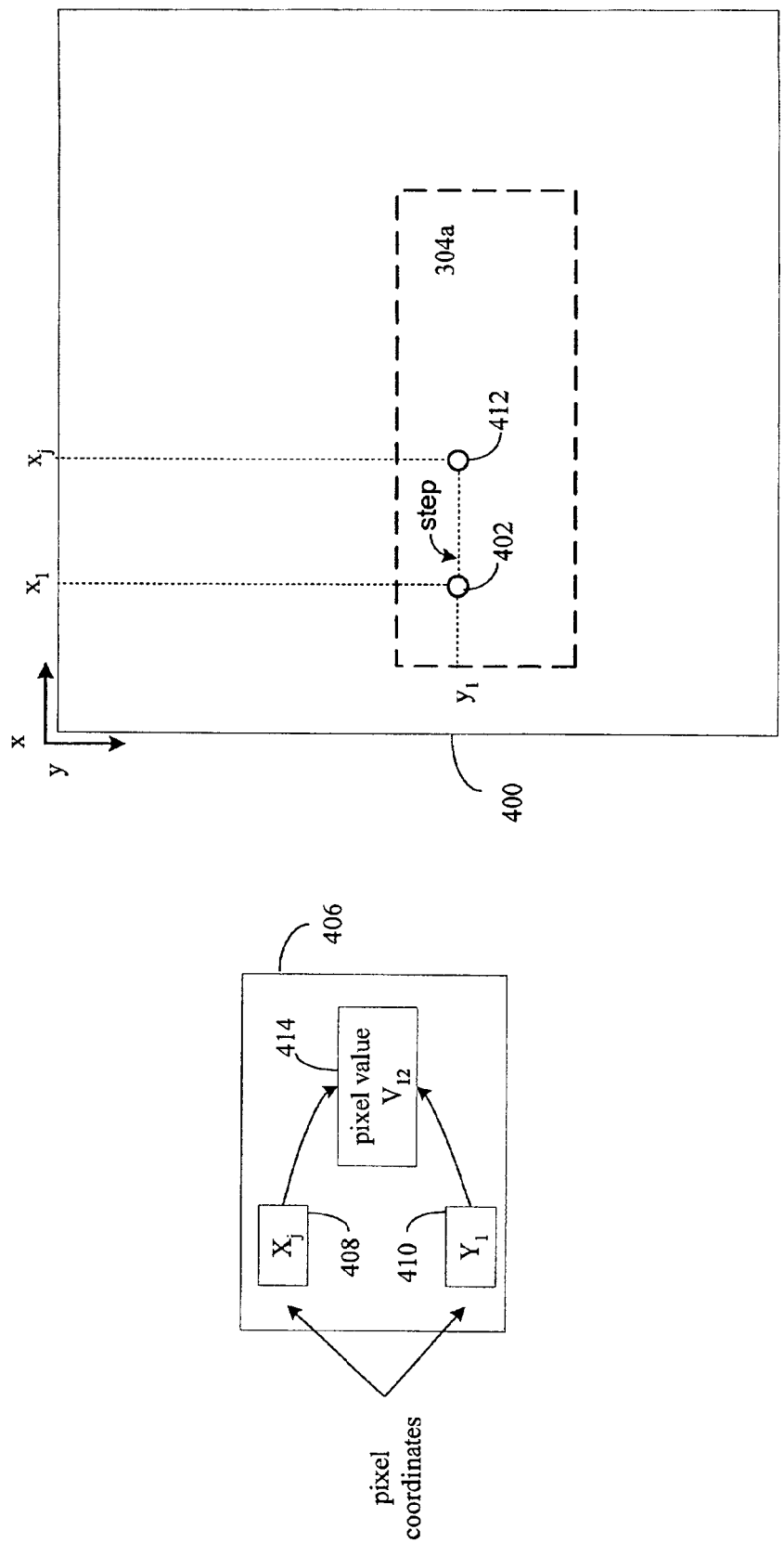

A more detailed example of the procedure followed by the feature finder 208 is further illustrated in FIGS. 3A–3B using the found feature 210 in the region 304a as an example. Accordingly, during a frame 400 the feature finder 208 randomly selects a first pixel 402 (which for this example, is located at coordinates $(x_1, y_1)$) included in the region 304a. At this point, a pixel value $V_{11}$ associated with the first pixel 402 is stored in a register 404 using what is referred to as a pixel grabber 406. It should be noted that the pixel grabber 406 operates by specifying a particular pixel coordinate set $(x_i, y_j)$ in, respectively, an x coordinate register 408 and a y coordinate register 410 the pixel value of which is stored in the register 404. In the example shown in FIG. 3A, the pixel value of the first pixel 402 is substantially zero.

During a next scan (i.e., during a subsequent video frame) shown in FIG. 3B, the value of the x coordinate is incremented by a specified step value STEP whereas the y coordinate value remains constant. It should be noted that the specified step value STEP can be, for example, a single pixel step or for that matter, any appropriate multi-pixel step. In the case shown in FIG. 3B, a second pixel 412 is therefore associated with the next pixel location of $(x_j, y_1)$ where $x_j$ represents an x coordinate that is the step increment value STEP displaced from the initial x coordinate $x_1$ (i.e., $x_j = x_1 +$ STEP). At this point, the pixel value $V_{12}$ associated with the second pixel 412 is stored in a register 414 and compared to the previous pixel value $V_{11}$. Since the value $V_{12}$ is greater than the value $V_{11}$, the second pixel 412 corresponds to a rising edge feature corresponding to the feature 210. The region 304a is now marked as used since a feature (either falling or rising edge) has been located therein.

Once a predetermined number of scans has been completed (each of which corresponds to a different video frame), a determination is made whether or not a sufficient number of features have been found. It should be noted that once a feature is found and the corresponding region is marked as used, then that particular region is no longer subject to the pixel by pixel evaluation. In one embodiment, a minimum number of found features can be as low as four whereas a desired number of found features can be as many as ten or more. In this way, the likelihood of providing an accurate and reliable estimate of the horizontal resolution $H_{TOTAL}$ is substantially enhanced.

Although only the region 304a has been used in this example, it is well to note that the above describe procedure is performed substantially simultaneously on all the pseudo-randomly selected pixels $P_a$ through $P_m$ and their associated regions 304a through 304m.

Figure 4A:
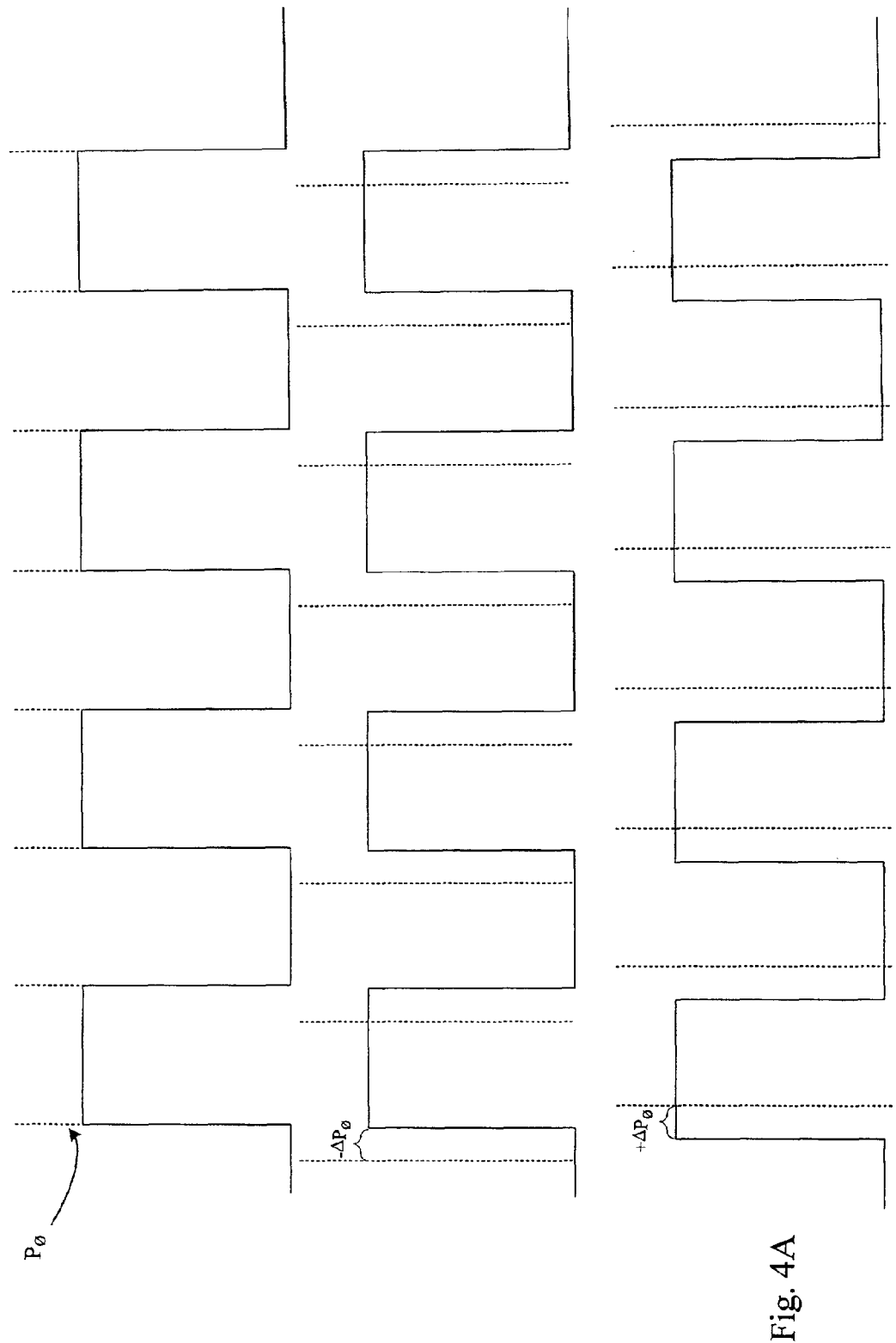
FIG. 4A graphically illustrates alignment of found features for a correct $H_{total}$ in accordance with an embodiment of the invention.
Figure 4B:
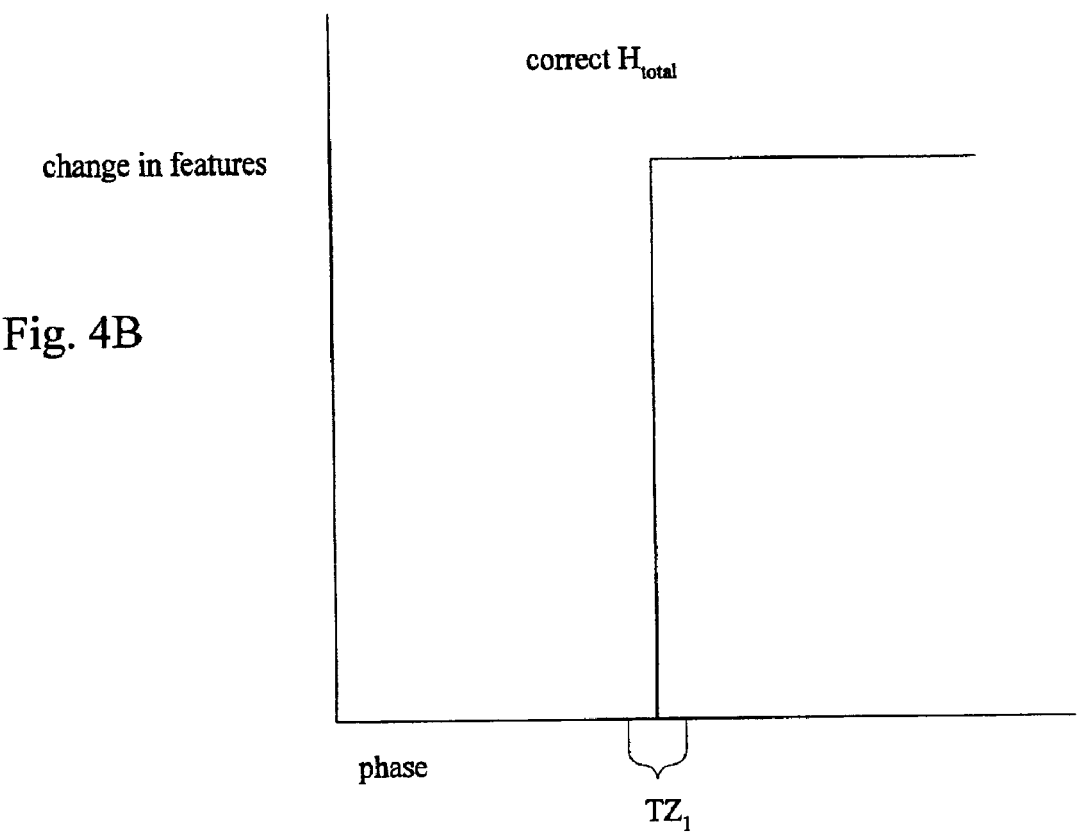
FIG. 4B illustrates a transition zone consistent with the correct $H_{total}$ of FIG. 4A.

Once the appropriate number of found features have been identified and their respective locations stored, a number of what are referred to as transition zones are measured by the transition zone detector 216. Since all features were created using the same pixel clock, when an estimated horizontal resolution $H_{TOTAL}$ is correct, then all features are aligned in such as way that when a pixel clock phase $P_\varnothing$ is varied, the number of found features that appear to move together approaches the number of found features. For example, referring to FIG. 4A, when the pixel clock phase $P_\varnothing$ is "true" (i.e., aligned with the edges of each of the found features), a variation $-\Delta P_\varnothing$ in pixel clock phase will result in the number of features sampled being zero whereas a variation $+\Delta P_\varnothing$ will result in the number of features sampled being substantially equal to the number of found features. This situation is graphically illustrated in FIG. 4B showing a transition zone $TZ_1$ corresponding to the situation illustrated in FIG. 4A where substantially all the found figures are aligned to $H_{TOTAL}$ and therefore the transition zone $TZ_1$ (defined as the range of pixel clock phases for a pre-determined change in the number of found features) is a minimum.

Figure 5B:
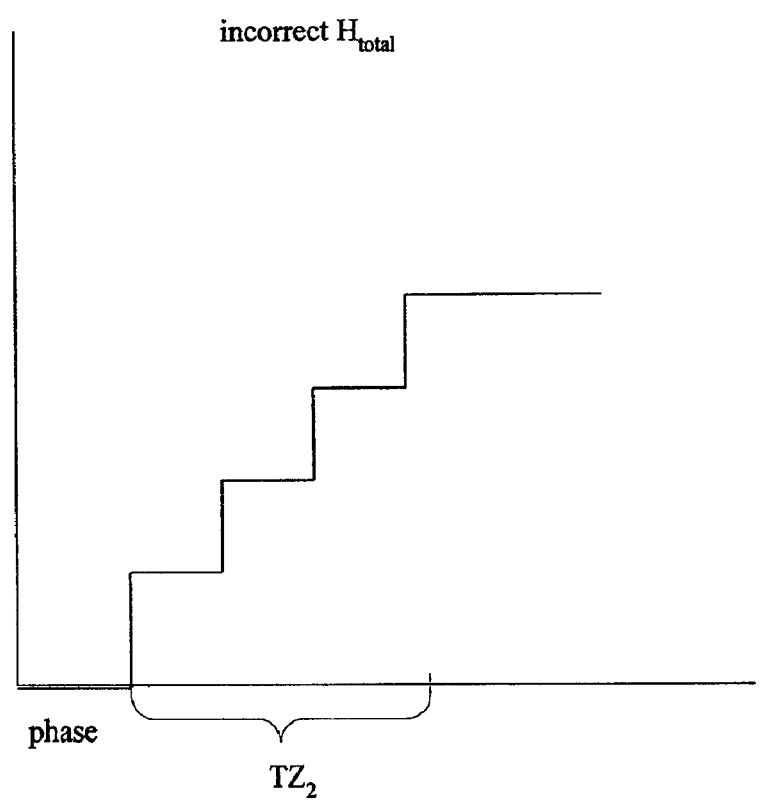
FIG. 5B illustrates a transition zone consistent with the incorrect $H_{total}$ of FIG. 5A.
Figure 5A:
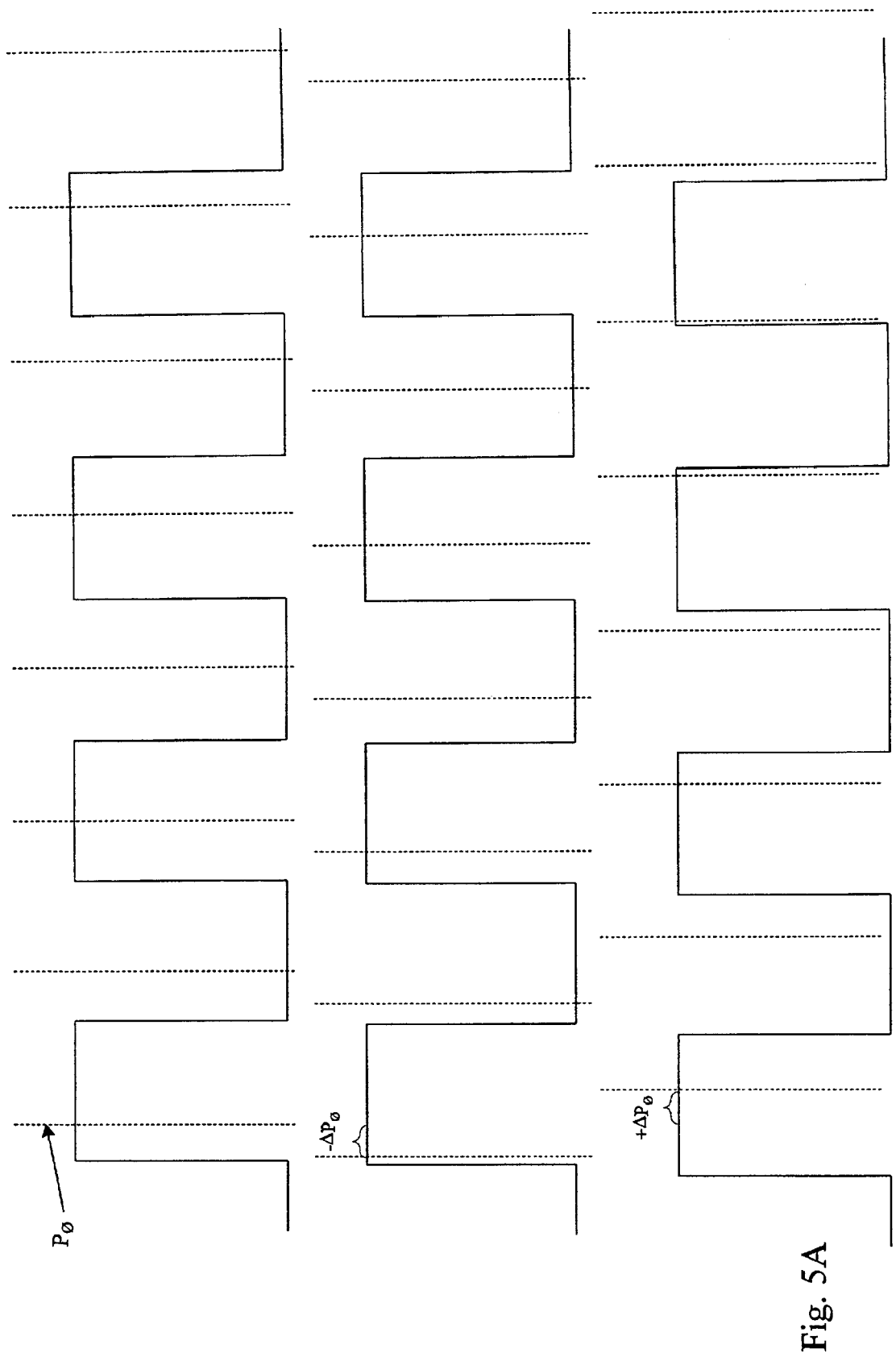
FIG. 5A graphically illustrates alignment of found features for an incorrect $H_{total}$ in accordance with an embodiment of the invention.

In the situation as shown in FIG. 5A where the horizontal resolution $H_{TOTAL}$ is incorrect, the found features do not all align and therefore any change in the number of found features that appear to move depends upon the pixel clock phase $P_\varnothing$. This particular situation is illustrated in FIG. 5B showing a transition zone $TZ_2$ that is substantially larger that the transition zone $TZ_1$. In this way, the most accurate estimate of the horizontal resolution is obtained by varying the horizontal resolution over a selected range and for each $H_{TOTAL}$ generate a corresponding transition zone by varying the pixel clock phase $P_\varnothing$ over a pre-determined pixel clock phase range of values (which in this example is $2\Delta P_\varnothing$). Once a set of transition zones has been generated and stored in a transition zone array, the minimum transition zone is determined which in turn corresponds to the best guess estimate of the horizontal resolution $H_{TOTAL}$.

Therefore, with reference to FIG. 1, the transition zone detector 216 includes a horizontal resolution scanner unit 230 arranged to provides a scan of a range of horizontal resolution values coupled to a feature tracker unit 232 that maintains the location of the found features. The feature tracker unit 232 updates the feature locations array during the scan of the horizontal resolutions by the horizontal resolution scanner unit 230. For each horizontal resolution value provided by the horizontal resolution scanner unit 230, a phase scanner unit 234 coupled to the feature tracker unit 232 varies the pixel clock phase $P_\varnothing$ over a pre-determined range of phase values generating in the process a number of associated transition zones that are stored in the transition zone array 218. The minimum transition zone detector unit 220 coupled to the transition zone array 218, detects a minimum transition zone which is used to provide a horizontal resolution value $H_{TOTAL}$ consistent with the video signal 204.

Still referring to FIG. 1, once the horizontal resolution $H_{TOTAL}$ value is generated, the horizontal estimator 206 provides the horizontal resolution value to the LCD 202 as well as the pixel clock phase estimator 222. The pixel clock phase estimator 222 estimates a pixel clock consistent with the video signal 204 with a flat region detector unit 240 by detecting a flat region of the video signal 204 as illustrated in FIG. 6A showing a representative video signal 700 based upon rising and falling edges stored in arrays 308 and 310, respectively. The flat region detector unit 240 performs a sum of differences operation at a specified number of locations on the video signal 700. A flat region 702 is defined as that region of the video signal 700 where the sum of differences for adjacent points is substantially zero, or in the alternative, below a pre-determined value as graphically illustrated in FIG. 6B. Once the flat region 702 has been determined, at best phase unit 242 using a binary search approach, affixes the best phase as being that phase substantially in the middle of the flat region 702.

Figure 7:
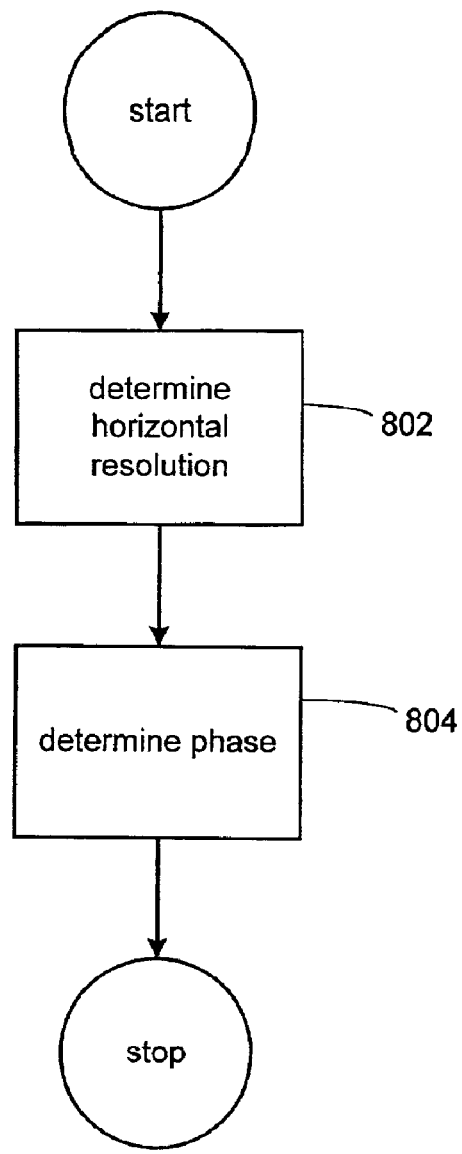
FIG. 7 describes a process for synchronizing an analog video signal to an LCD monitor in accordance with an embodiment of the invention.
Figure 8:
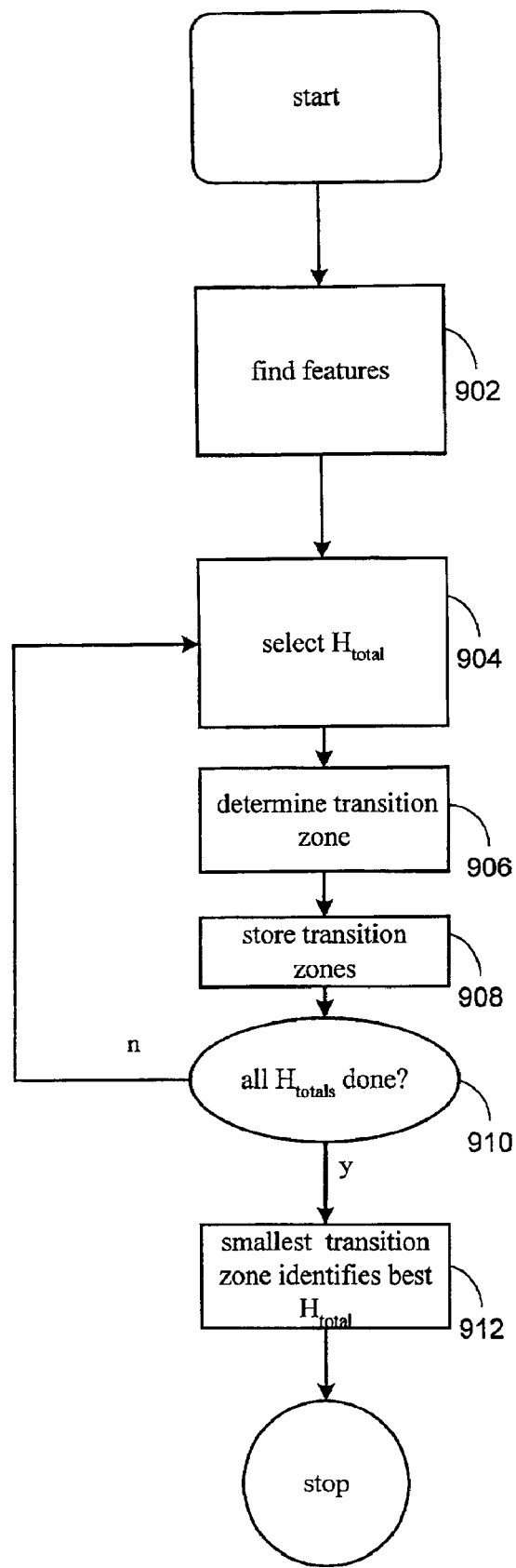
FIG. 8 illustrates a process for determining horizontal resolution in accordance with an embodiment of the invention.

FIGS. 7–13 describe a process 800 for synchronizing an analog video signal to an LCD monitor in accordance with an embodiment of the invention. As shown in FIG. 7, the process 800 begins at 802 by determining a horizontal resolution and at 804 by determining a phase based in part upon the determined horizontal resolution. FIG. 8 illustrates a process 900 for determining horizontal resolution in accordance with an embodiment of the invention. The process 900 begins at 902 by finding features and at 904 by selecting a range of horizontal resolutions. At 906, for each of the range of horizontal resolutions, a transition zone is measured for each found features each of which is stored at 908. At 910, a determination is made whether or not all of the range of horizontal resolutions have been completed. If it has been determined that not all of the range of horizontal resolutions have been used, control is passed back to 904, otherwise, a smallest transition zone is determined at 912 which identifies a best horizontal resolution.

Figure 9:
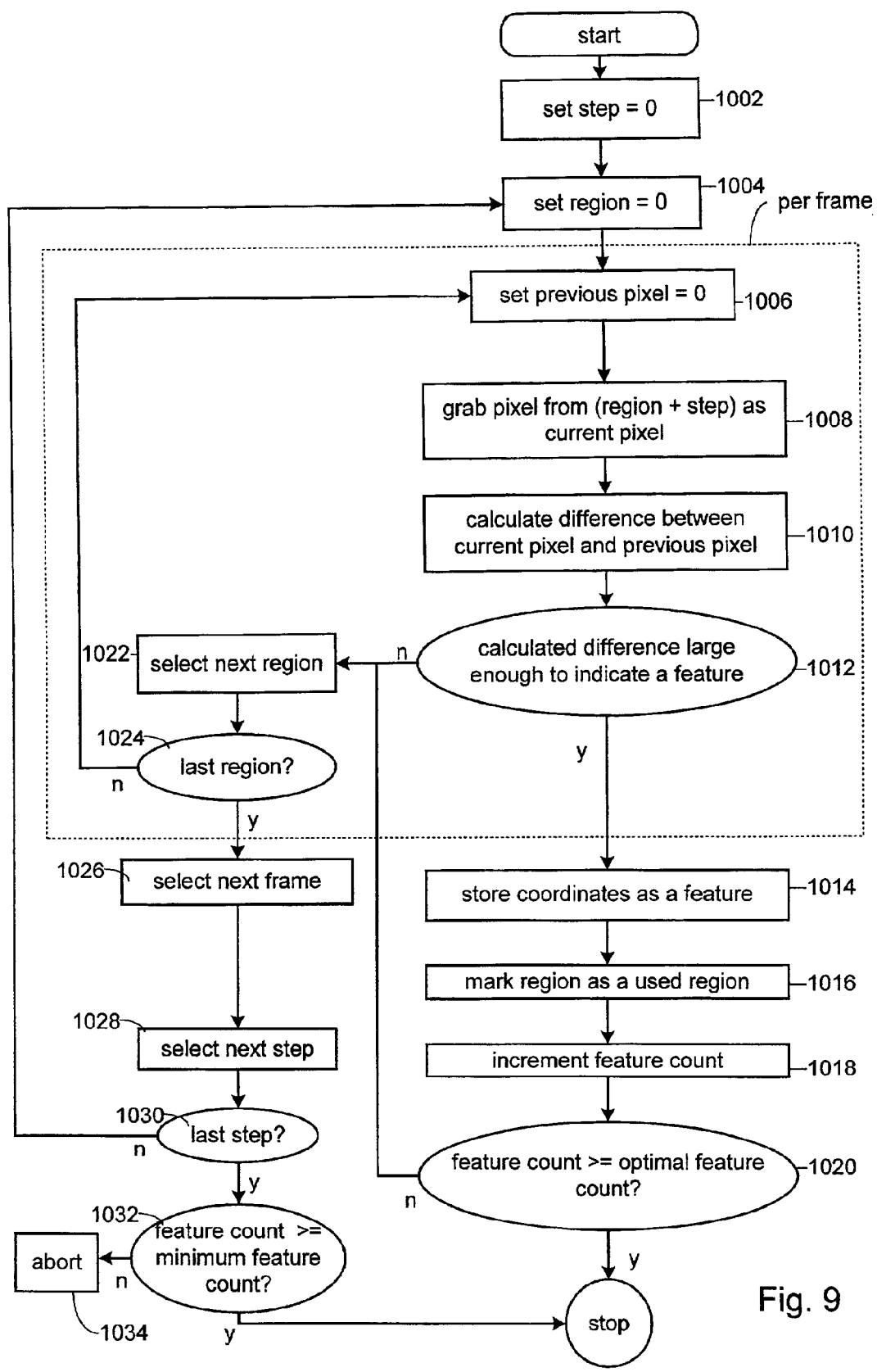
FIG. 9 illustrates a process for finding a feature in accordance with an embodiment of the invention.

FIG. 9 illustrates a process 1000 for finding a feature in accordance with an embodiment of the invention. The process 1000 begins at 1002 by setting step equal to zero and at 1004 by setting a region equal to zero. At 1006, a previous pixel value is set equal to zero while at 1008, a pixel value is grabbed from a location determined by region plus step and identified as a current pixel. At 1010, a difference between the current pixel and the previous pixel is calculated while at 1012, a determination is made if the calculated difference is great enough to indicate a feature. If it is determined that the calculated difference does indicate a feature, then the found features are stored and identified as a feature at 1014 while at 1016, the region is marked as a used region and the feature count is updated at 1018. At 1020, a determination is made whether or not the feature count is greater than or equal to an optimal feature count. If it is so determined that the feature count is greater than or equal to the optimal feature count, then the process 1000 stops, otherwise, a next region is selected at 1022.

Returning back to 1012, if it had been determined that the calculated difference is not great enough to indicate a feature, then control is passed directly to 1022 and at 1024, a determination is made whether or not the selected region is a last region. If the selected region is not a last region, then control is passed back to 1006, otherwise, a next frame is selected at 1026 and a next step is selected at 1028. At 1030, a determination is made whether or not the selected step is a last step, which if it is not, then control is passed to 1004, otherwise, a determination is made at 1032 whether or not the feature count is greater than or equal to a minimum feature count. If the feature count is not greater than or equal to the minimum feature count, then the process 1000 is aborted at 1034, otherwise, the process 1000 stops normally.

Figure 10:
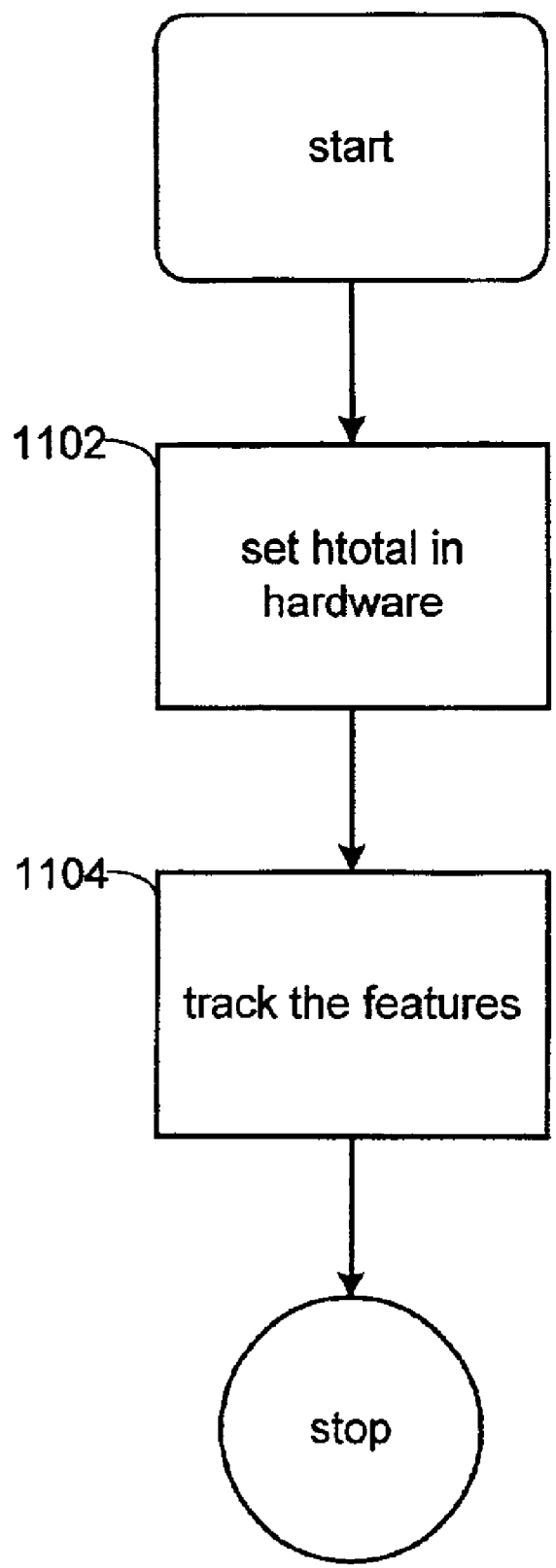
FIG. 10 describes a process for selecting horizontal resolution $H_{TOTAL}$ in accordance with an embodiment of the invention.

FIG. 10 describes a process 1100 for selecting horizontal resolution $H_{TOTAL}$ in accordance with an embodiment of the invention. The process 1100 begins at 1102 where the horizontal resolution is set to a default horizontal resolution (typically corresponding to standard resolutions such as 480×640, etc.) and the features are then tracked at 1104. By tracking, it is meant that whenever the horizontal resolution is varied, the number of features will vary, or appear to move. In order to maintain the true number of found features independent of the variation of horizontal resolution (in order to ascertain the change in the number of found features due solely to the pixel clock phase $P_\emptyset$), the number of features are tracked as described below.

Figure 11:
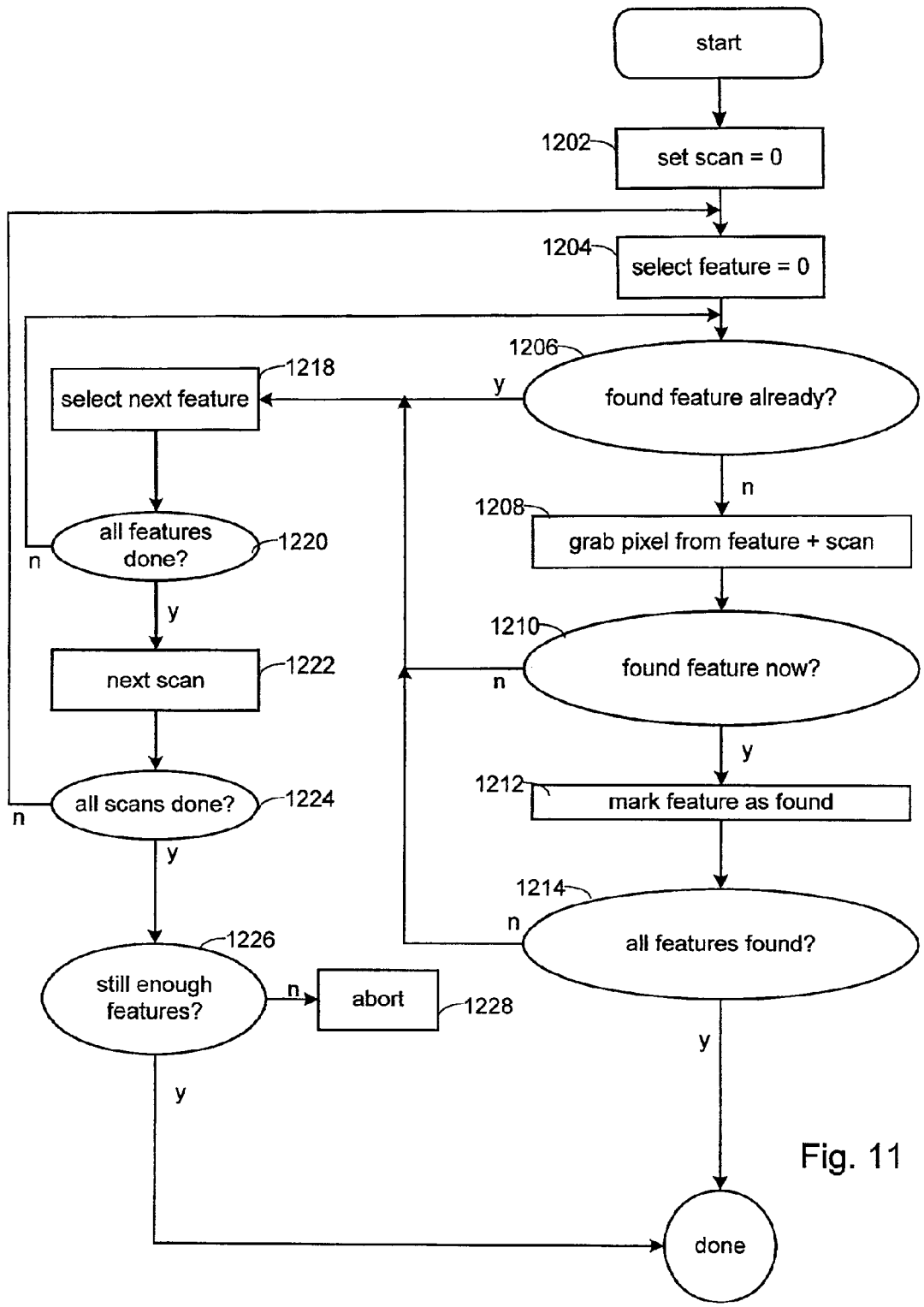
FIG. 11 shows a flowchart detailing a process for tracking features in accordance with an embodiment of the invention.

FIG. 11 shows a flowchart detailing a process 1200 for tracking features in accordance with an embodiment of the invention. The process 1200 begins at 1202 by setting a scan variable equal to zero and at 1204 by setting a feature count at zero at 1206. Next, at 1208, a determination is made whether or not the feature is a found feature or not. If the feature is not a found feature, then a pixel from location corresponding to feature count plus the scan variable at 1210 while at 1212, a determination is made whether or not the feature is found. If the feature is determined to be found, then the feature is marked as found and a determination at 1216 is then made to determine whether or not all features have been found. If all features have been found, then the process 1200 stops, otherwise control is passed to 1218 where a next feature is selected. Returning to 1208, if the feature was a found feature, then control is passed to 1018. Returning to 1212, if the feature was a found feature, then control is passed to 1018.

Returning to 1018, control is then passed to 1020 where a determination is made whether or not all features have been done. If all features have not been done, then control is passed back to 1208, otherwise, a next scan is done at 1022 while at 1024, a determination is made whether or not all scans have been done. If all scans have been done, then control is passed to 1206, otherwise, a determination is made at 1026 whether or not there are enough features. If there are not enough features, then the process 1200 aborts, otherwise the process 1200 stops normally.

Figure 12:
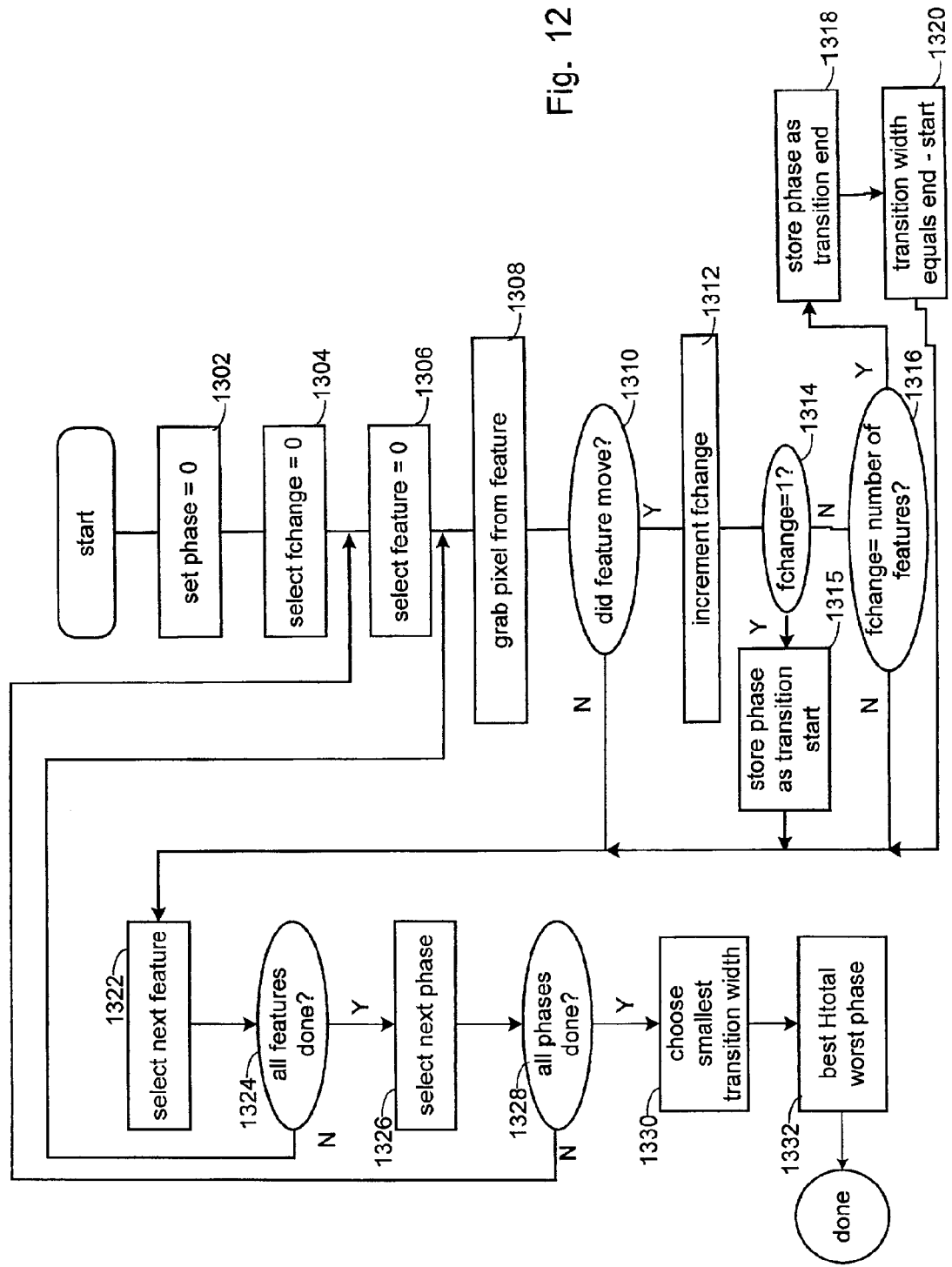
FIG. 12 shows a flowchart detailing a process for measuring a transition zone in accordance with an embodiment of the invention.

FIG. 12 shows a flowchart detailing a process 1300 for measuring a transition zone in accordance with an embodiment of the invention. The process 1300 begins at 1302 by setting a phase equal to zero and at 1304 by setting a feature change (fchange) variable equal to zero. At 1306, a feature variable is set to zero, while at 1308, a pixel is grabbed from the feature and a determination is made at 1310, whether or not the feature moved. If the feature did move, then at 1312, fchange is incremented and a determination is made at 1314 if fchange is equal to one. If fchange is equal to one, then the phase is stored as a transition start at 1315 and control is passed to 1322 where a next feature is selected whereas if not equal to one, then a determination is made at 1316 if fchange is equal to the number of features. If fchange is equal to the number of features, then the phase is stored as a transition end at 1318 and a transition width is set equal to transition end minus transition start at 1320, otherwise control is passed to 1322. Returning back to 1310, if the feature did not move, then control is passed directly to 1322.

At 1324, a determination is made whether or not all features have been done and if not, then control is passed directly to 1306, otherwise, a next phase is selected at 1326 followed by a determination at 1328 whether all phases have been done. If all phases have been done, then a smallest transition width is selected at 1330 which is associated with a best horizontal resolution, worst phase at 1332.

Figure 13:
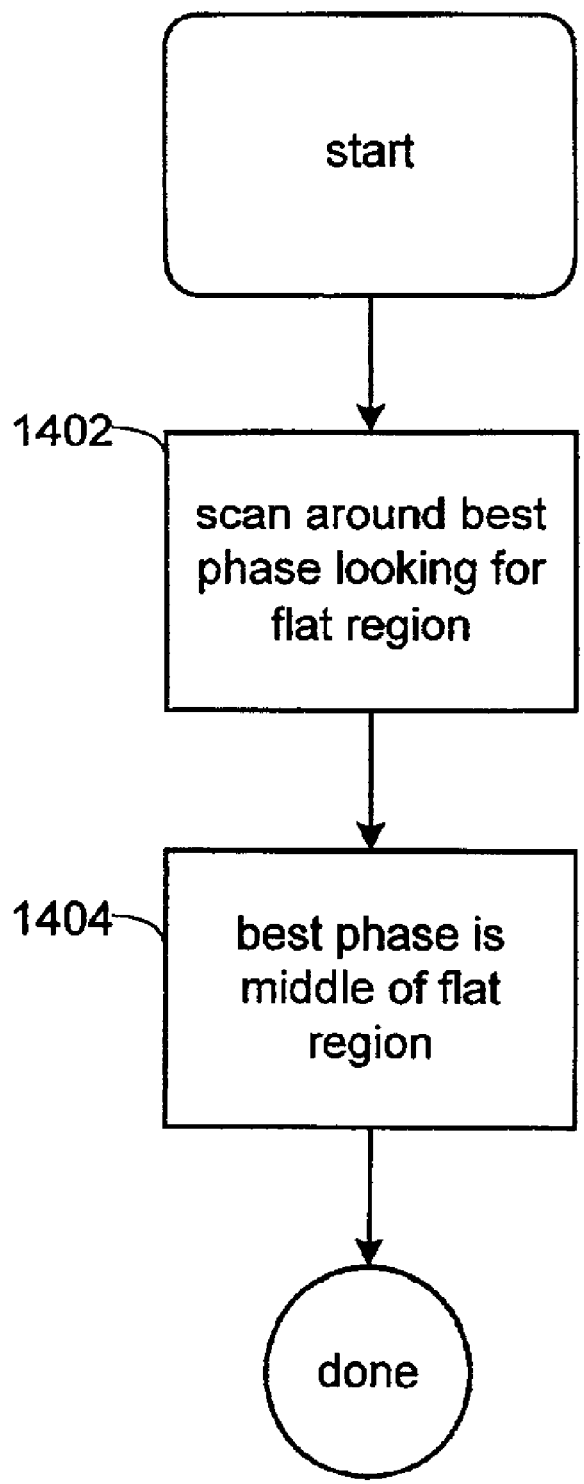
FIG. 13 shows a flowchart detailing a process for determining a phase in accordance with an embodiment of the invention.

FIG. 13 shows a flowchart detailing a process 1400 for determining a phase in accordance with an embodiment of the invention. The process 1400 begins at 1402 scanning around in order to determine a flat region at setting a best phase at the middle of the flat region at 1404.

An approach to determining a horizontal resolution in accordance with another embodiment of the invention is discussed with reference to FIGS. 14A and 14B and FIG. 15. In order to improve the speed and efficiency of synchronizing the analog signal to the digital display, especially with regards to the horizontal synchronization, a predictive approach to determining $H_{total}$ can be used. Such an approach relies upon the fact that the digital display is linear in nature and, therefore, scales linearly. More particularly, the linear nature of the digital display is embodied in Equation (2) that demonstrates the linear scaling of the digital display:

$$C_{X1}/H_{total1}=C_{X2}/H_{total2} \qquad (2)$$

where $C_{X1}$ is co-ordinate of a pixel of a feature at $H_{total1}$;

$C_{X2}$ is co-ordinate of the pixel of the feature at $H_{total2}$.

In order to predict a true $H_{total}$, any two preliminary $H_{total}$ values (typically referred to as $H_{total1}$ and $H_{total2}$) are chosen. These preliminary $H_{total}$ values can be selected in any manner deemed appropriate for the situation at hand. Once the preliminary $H_{total}$ values are selected, a horizontal pixel co-ordinate for each found feature is measured for each preliminary $H_{total}$ values, typically resulting in an integral pixel co-ordinate value plus a remainder value indicating that the associated preliminary $H_{total}$ value is not the true $H_{total}$.

One of the properties of the linear nature of the digital display is that as the preliminary $H_{total}$ values converge on the true $H_{total}$ value, the spread (i.e., the difference between a maximum and a minimum remainder value for a given feature) of the remainder values decreases until a minimum spread value is reached consistent with the true Htotal value. This property is analogous to the description related to FIGS. 4 and 5 regarding ascertaining a minimum transition zone and the associated true $H_{total}$ since the true $H_{total}$ value will result in proper alignment of the pixel co-ordinate and the display screen co-ordinates (ignoring the effect of phase, for the moment).

Figure 14A:
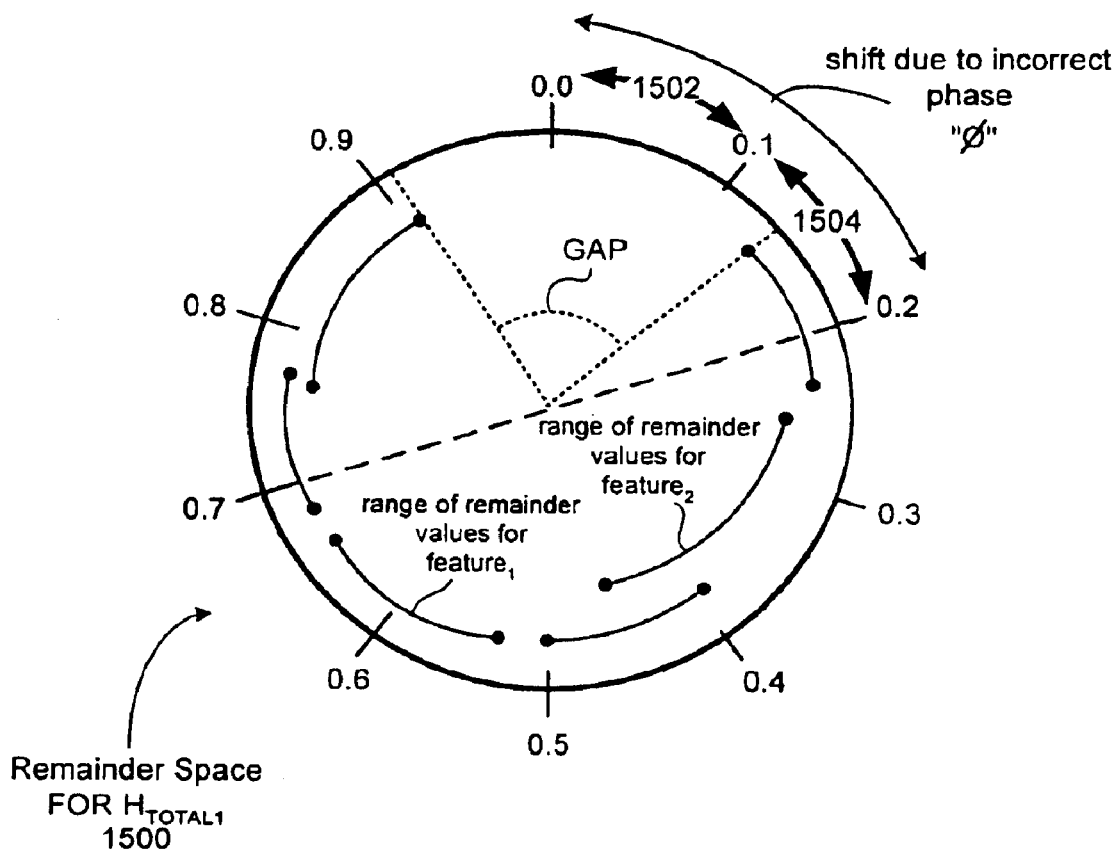
FIG. 14A illustrates an exemplary remainder space for a first Htotal in accordance with an embodiment of the invention.
Figure 14B:
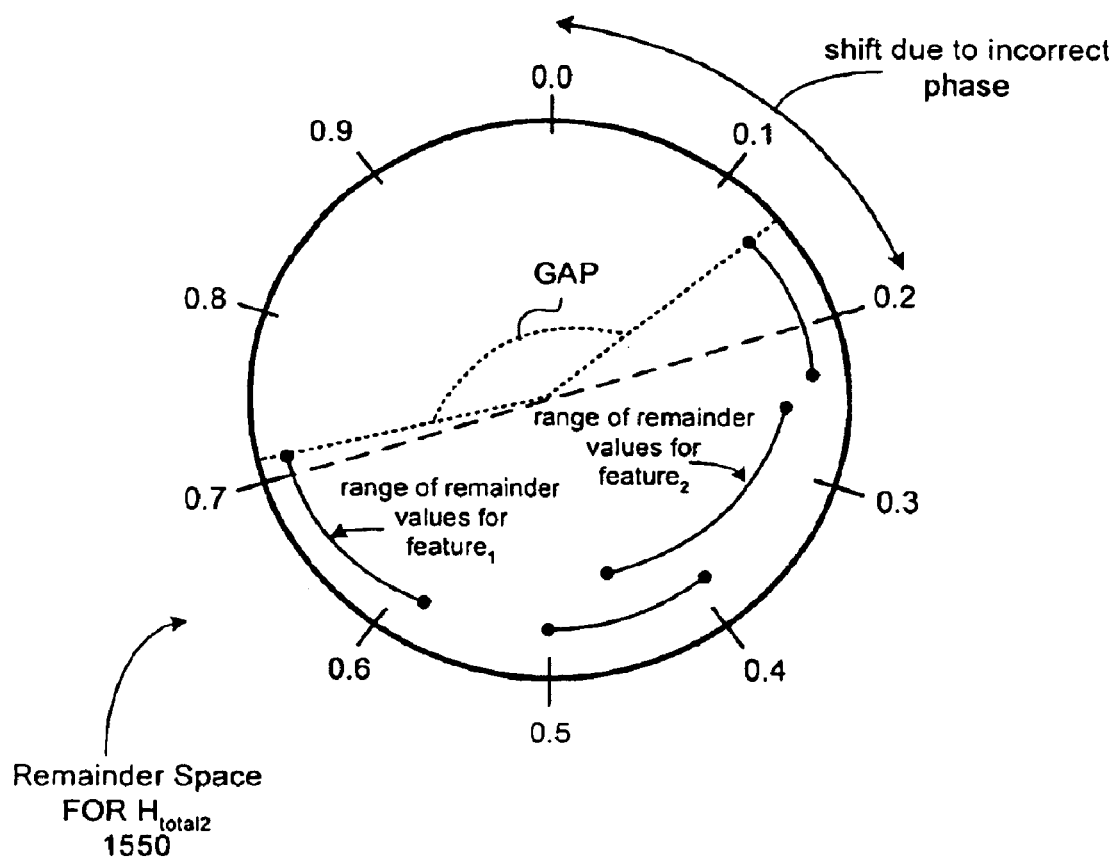
FIG. 14B illustrates an exemplary remainder space for a second Htotal in accordance with an embodiment of the invention.

FIG. 14A illustrates an exemplary remainder space 1500 for a preliminary $H_{total}$ value in accordance with an embodiment of the invention. Accordingly, the remainder space 1500 is most conveniently displayed as a circle equally divided into a number of segments each of which corresponds to a range of remainder values. For this example, each segment represents a range of remainder values of 0.10. For example, the segment 1502 represents that portion of the remainder space 1500 that corresponds to a range of remainder values of approximately 0.0 to 0.1, whereas a segment 1504 corresponds to a range of remainder values of approximately 0.1 to 0.2, and so on. It is important to note that since at this point in the analysis, the phase has not been determined, that the entire set of calculated remainder values will essentially be rotated by a phase angle Ø. The phase angle represents the unknown difference between the true phase angle (to be determined) and the actual phase being used to calculate the positions of the pixels at this point in the analysis.

In order to predict the horizontal resolution, therefore, at, for example, the first preliminary $H_{total1}$, a pixel from each of the found features is selected. Once selected, the range of predicted co-ordinates is calculated using Eq. (2) for a range of preliminary $H_{total1}$ values and plotted in the remainder space 1500 as shown for each of the found figures. This process is repeated for a range of preliminary $H_{total}$ values in such a way that a particular remainder space is associated with a particular preliminary $H_{total}$ value as illustrated in FIG. 14B showing a remainder space 1550 associated with the second preliminary $H_{total}$ value $H_{total2}$. After all the found figures have been evaluated, the associated remainder spaces are compared to one another in order to determine a largest gap value β. It should be noted that the gap value β is directly related to the degree of randomness of the observed remainder values for the set of features tested at each preliminary $H_{total}$. By selecting the largest gap value β, the degree of randomness is minimized for that particular range of $H_{total}$ values since the spread of calculated remainders is commensurably reduced. In this way, the preliminary $H_{total}$ value having the smallest degree of remainder randomness (i.e., the largest gap value β) is that particular one of the range of preliminary values that is closest to the true $H_{total}$ value. This is analogous to selecting a minimum transition zone described above.

For example, assume that for a pixel A associated with a feature Y (and located at Cx=500 for true $H_{total}$=1344),

| $H_{total}$ | Measured Co-ordinate of pixel A |
|---|---|
| $H_{total1}$ = 1340 | $C_{A1}$ = 498.51 |
| $H_{total2}$ = 1350 | $C_{A2}$ = 502.23 |

Using this approach, each measured co-ordinate value has a remainder indicating that the associated $H_{total}$ is not the true $H_{total}$. However, one important property of using linear scaling is demonstrated using the true $H_{total}$ (1344) and Equation (2) when a prediction for the position of the pixel A at the true $H_{total}$ 1344 is made:

for true $H_{total}$=1344

| Predicted Co-ordinate | (Pred. Co-ord) − (True Co-ordinate) |
|---|---|
| $C_1$ = {(498 × 1344)/1340} = 499.49 | 499.49 − 500 = −.51 |
| $C_2$ = {(502 × 1344)/1350} = 499.77 | 499.77 − 500 = −.23 | assuming $H_{total}$=1345

| Predicted Co-ordinate | (Pred. Co-ord) − True Co-ordinate |
|---|---|
| $C_1$ = {(498 × 1345)/1340} = 499.86 | 499.86 − 500 = −.14 |
| $C_2$ = {(502 × 1345)/1350} = 500.14 | 500.14 − 500 = +.14 |

Therefore, as can be seen, the remainders of the predicted co-ordinates track together (i.e., both are negative with respect to the true co-ordinate) whereas when the $H_{total}$ is not correct (as in the case of $H_{total}$=1345), the remainders of the predicted co-ordinates do not track and are, therefore, more random in nature. Therefore, as the $H_{total}$ converges on the true $H_{total}$, the observed randomness of the remainder space is reduced and the gap value β increases.

Figure 15:
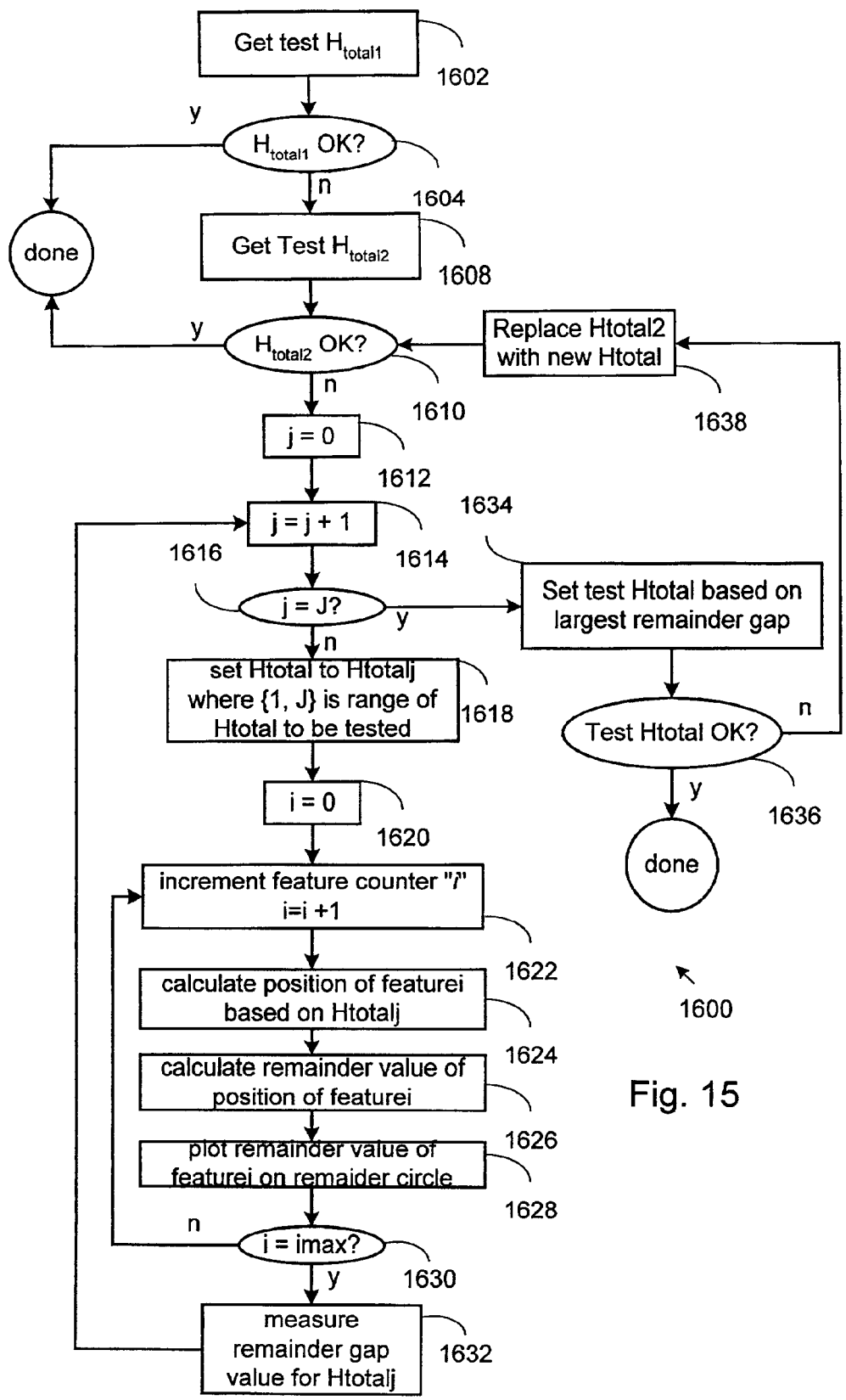
FIG. 15 shows a flowchart detailing a process for automatically providing a horizontal synchronization in accordance with an embodiment of the invention.

Accordingly, FIG. 15 is a flowchart detailing a process 1600 for predicting a horizontal resolution in accordance with an embodiment of the invention. The process 1600 begins at 1602 by providing a first $H_{total}$ and determining if the first $H_{total}$ is a true $H_{total}$ at 1604. In one embodiment, the determining at 1604 is performed in much the same manner as in FIGS. 4A and 4B with reference to finding a minimum transition zone. If it is determined that the first Htotal1 is not the true $H_{total}$, then a second Htotal2 is provided at 1608 and a determination is made at 1610 whether or not the second $H_{total}$ is the true $H_{total}$. As with the first $H_{total1}$, the determining 1610 can be performed using the minimum transition zone approach described above with reference to FIGS. 4A and 4B. If either the first $H_{total1}$ or the second $H_{total2}$ is the true Htotal, then processing stops, otherwise, an $H_{total}$ counter j is initialized to zero ("0") at 1612 and incremented at 1614 by one ("1"). Next, at 1616, a determination is made whether or not the $H_{total}$ counter j is equal to a maximum $H_{total}$ count J indicating that the end of a range of $H_{total}$ has been reached. If the end of the range of $H_{total}$ has not been reached (i.e., j does not equal J), then $H_{total}$ is set to $H_{total}j$ where $H_{total}j$ is one of the range of $H_{total}$ at 1618. Thereafter, a feature count index i is initialized to zero ("0") at 1620 and the feature count index i is then incremented by one ("1") at 1622. Next, at 1624, a position of a selected coordinate of the feature i is calculated based upon the $H_{totalji}$ and at 1626, a remainder value of the calculated position of the feature i is calculated. At 1628, the remainder value is plotted on a remainder space associated with the $H_{totalj}$ while at 1630, a determination is made whether or not the feature count index i is equal to the maximum feature count index I indicating that all the found features have been evaluated at the $H_{totalj}$. If it has been determined that not all the features have been evaluated, then control is passed back to 1622 where the feature count index i is incremented by "1", otherwise, control is passed to 1632 where the a remainder gap value is determined for the $H_{total}j$ after which control is passed back to 1614 where there $H_{total}$ counter i is incremented by "1".

Returning back to 1616, if it had been determined that the range of $H_{total}$ values have been evaluated, then a best $H_{total}$ value is set at 1634 based upon a largest remainder gap based upon the determined remainder gaps provided at 1632. Next at 1636, a determination is made whether or not the best $H_{total}$ value is the true $H_{total}$ value. If it is determined that the best $H_{total}$ value is the true $H_{total}$ value, then the process ends, otherwise, the second $H_{total2}$ is replaced with the best $H_{total}$ value at 1638 whereby the process 1600 is run again until the best $H_{total}$ value converges to the true Htotal value within either an acceptable time period or other appropriate limitation. It should be noted, that the initial $H_{total}$ values can be provided in any manner deemed appropriate. For example, the $H_{total1}$ can be provided by a mode selector that relies upon measuring the number of active pixels in the active image and provides an initial set of $H_{total}$ values based upon a look up table (LUT) of standard horizontal resolutions.

Figure 16:
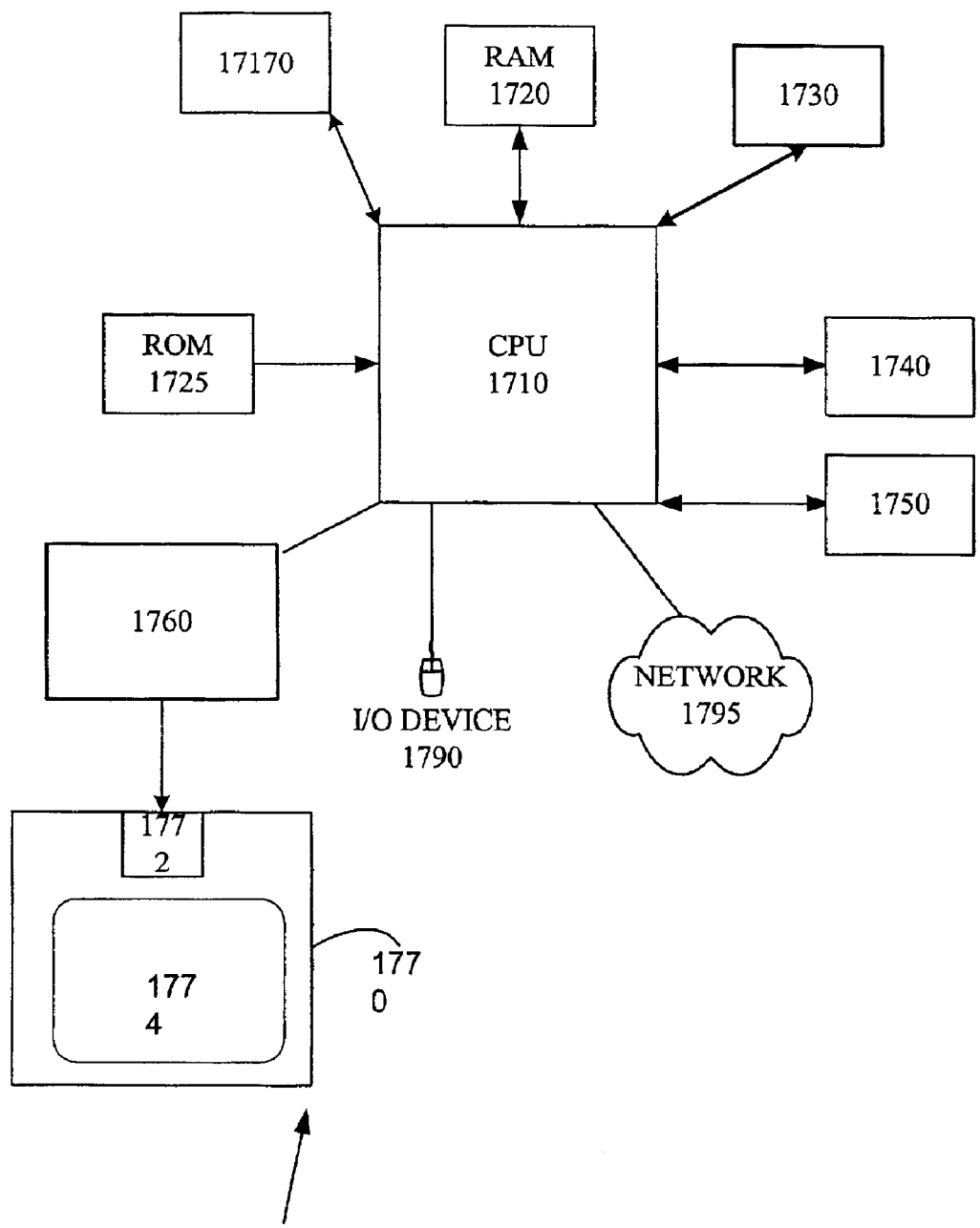
FIG. 16 illustrates a computer system employed to implement the invention.

FIG. 16 illustrates a computer system 1700 employed to implement the invention. Computer system 1700 is only an example of a graphics system in which the present invention can be implemented. Computer system 1700 includes central processing unit (CPU) 810, random access memory (RAM) 1720, read only memory (ROM) 1725, one or more peripherals 1730, graphics controller 1760, primary storage devices 1740 and 1750, and digital display unit 1770. As is well known in the art, ROM acts to transfer data and instructions uni-directionally to the CPUs 810, while RAM is used typically to transfer data and instructions in a bi-directional manner. CPUs 810 may generally include any number of processors. Both primary storage devices 1740 and 1750 may include any suitable computer-readable media. A secondary storage medium 880, which is typically a mass memory device, is also coupled bi-directionally to CPUs 1710 and provides additional data storage capacity. The mass memory device 880 is a computer-readable medium that may be used to store programs including computer code, data, and the like. Typically, mass memory device 880 is a storage medium such as a hard disk or a tape which generally slower than primary storage devices 1740, 1750. Mass memory storage device 880 may take the form of a magnetic or paper tape reader or some other well-known device. It will be appreciated that the information retained within the mass memory device 880, may, in appropriate cases, be incorporated in standard fashion as part of RAM 1720 as virtual memory.

CPUs 1710 are also coupled to one or more input/output devices 890 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1710 optionally may be coupled to a computer or telecommunications network, e.g., an Internet network or an intranet network, using a network connection as shown generally at 895. With such a network connection, it is contemplated that the CPUs 1710 might receive information from the network, or might output information to the network in the course of performing the above-described method steps. Such information, which is often represented as a sequence of instructions to be executed using CPUs 1710, may be received from and outputted to the network, for example, in the form of a computer data signal embodied in a carrier wave. The above-described devices and materials will be familiar to those of skill in the computer hardware and software arts.

Graphics controller 1760 generates analog image data and a corresponding reference signal, and provides both to digital display unit 1770. The analog image data can be generated, for example, based on pixel data received from CPU 1710 or from an external encode (not shown). In one embodiment, the analog image data is provided in RGB format and the reference signal includes the VSYNC and HSYNC signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A method of automatic generation of horizontal synchronization of an analog signal to a digital display, comprising:
    finding a number of features;
    for each of a range of test Htotal values,
        calculating a pixel co-ordinate value for each of the found features;
        determining a pixel co-ordinate remainder value associated with each of the pixel co-ordinate values; and
    determining a maximum gap value of the pixel co-ordinate remainder values associated with a true horizontal resolution.

2. A method as recited in claim 1, wherein the range of test Htotal values is based upon the first test Htotal value and the second test Htotal value.

3. A method as recited in claim 1 wherein the determining a maximum gap value comprises:
    plotting the pixel co-ordinate remainder values in a remainder space associated with each of the range of test Htotal values; and
    comparing a first selected one of the plotted pixel co-ordinate remainder values with a second selected one of the plotted pixel co-ordinate remainder values.

4. A method as recited in claim 3, wherein the comparing is a subtraction.

5. A method as recited in claim 2 further comprising:
    determining if either the first test Htotal value or the second test Htotal value is the true Htotal value.

6. A method as recited in claim 3, wherein the plotted pixel co-ordinate values are offset by a phase differential.

7. A method as recited in claim 6, wherein the phase differential is based upon a difference between a true phase and a current phase.

8. An apparatus for automatically providing a horizontal synchronization of an analog signal to a digital display, comprising:
    means for finding a number of features;
    for each of a range of test Htotal values,
        means for calculating a pixel co-ordinate value for each of the found features;
        means for determining a pixel co-ordinate remainder value associated with each of the pixel co-ordinate values; and
        means for determining a maximum gap value of the pixel co-ordinate remainder values associated with a true horizontal resolution.

9. An apparatus as recited in claim 8, wherein the range of test Htotal values is based upon the first test Htotal value and the second test Htotal value.

10. An apparatus as recited in claim 8 wherein the means for determining a maximum gap value comprises:
    means for plotting the pixel co-ordinate remainder values in a remainder space associated with each of the range of test Htotal values; and
    means for comparing a first selected one of the plotted pixel co-ordinate remainder values with a second selected one of the plotted pixel co-ordinate remainder values.

11. An apparatus as recited in claim 10, wherein the comparing is a subtraction.

12. An apparatus as recited in claim 9 further comprising:
    means for determining if either the first test Htotal value or the second test Htotal value is the true Htotal value.

13. An apparatus as recited in claim 10, wherein the plotted pixel co-ordinate values are offset by a phase differential.

14. An apparatus as recited in claim 13, wherein the phase differential is based upon a difference between a true phase and a current phase.

15. Computer program product for automatic generation of horizontal synchronization of an analog signal to a digital display, comprising:
    computer code for finding a number of features;
    computer code for calculating a pixel co-ordinate value for each of the found features for each of a range of test Htotal values;
    computer code for determining a pixel co-ordinate remainder value associated with each of the pixel co-ordinate values for each of a range of test Htotal values;
    for each of a range of test Htotal values, determining a maximum gap value of the pixel co-ordinate remainder values associated with a true horizontal resolution; and
    computer readable medium for storing the computer code.

16. Computer program product as recited in claim 15, wherein the range of test Htotal values is based upon the first test Htotal value and the second test Htotal value.

17. Computer program product as recited in claim 15 wherein the determining a maximum gap value comprises:
    computer code for Htotal values, plotting the pixel co-ordinate remainder values in a remainder space associated with each of the range of test Htotal values; and
    computer code for comparing a first selected one of the plotted pixel co-ordinate remainder values with a second selected one of the plotted pixel co-ordinate remainder values.

18. Computer code as recited in claim 17, wherein the comparing is a subtraction.

19. Computer program product as recited in claim 16 further comprising:
    computer code for determining if either the first test Htotal value or the second test Htotal value is the true Htotal value.

20. Computer program product as recited in claim 18, wherein the plotted pixel co-ordinate values are offset by a phase differential.

21. Computer program product as recited in claim 20, wherein the phase differential is based upon a difference between a true phase and a current phase.

* * * * *